United States Patent
Cha et al.

(10) Patent No.: US 10,229,565 B2
(45) Date of Patent: Mar. 12, 2019

(54) METHOD FOR PRODUCING HAPTIC SIGNAL AND ELECTRONIC DEVICE SUPPORTING THE SAME

(71) Applicant: SAMSUNG ELECTRONICS CO., LTD., Suwon-si, Gyeonggi-do (KR)

(72) Inventors: Aran Cha, Goyang-si (KR); Gong Bo Moon, Suwon-si (KR); Vadim Kudryavtsev, Suwon-si (KR); Kyung Tae Kim, Hwaseong-si (KR); Sun Key Lee, Seongnam-si (KR); Yo Han Lee, Seongnam-si (KR); Eun Jung Hyun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/825,935

(22) Filed: Nov. 29, 2017

(65) Prior Publication Data
US 2018/0151036 A1 May 31, 2018

(30) Foreign Application Priority Data
Nov. 30, 2016 (KR) .................. 10-2016-0162161

(51) Int. Cl.
| G08B 6/00 | (2006.01) |
| H04R 29/00 | (2006.01) |
| G10K 11/16 | (2006.01) |
| A63F 13/00 | (2014.01) |
| A63F 13/213 | (2014.01) |
| A63F 13/285 | (2014.01) |

(Continued)

(52) U.S. Cl.
CPC ............... *G08B 6/00* (2013.01); *A63F 13/00* (2013.01); *A63F 13/213* (2014.09); *A63F 13/285* (2014.09); *G10K 11/16* (2013.01); *G10L 21/06* (2013.01); *H04R 29/001* (2013.01); *G10L 21/0208* (2013.01); *H04N 13/332* (2018.05); *H04R 1/1083* (2013.01)

(58) Field of Classification Search
None
See application file for complete search history.

(56) References Cited

U.S. PATENT DOCUMENTS

| 8,000,825 B2 | 8/2011 | Ullrich et al. |
| 9,147,328 B2 * | 9/2015 | Ioffreda ............... H04R 3/00 |

(Continued)

OTHER PUBLICATIONS

Christian Hofmann et al., "A Morphological Approach to Single-channel Wind-Noise Suppression", International Workshop on Acoustic Signal Enhancement 2012, Sep. 4-6, 2012, 4 pages.

(Continued)

*Primary Examiner* — Paul Huber
(74) *Attorney, Agent, or Firm* — Nixon & Vanderhye P.C.

(57) ABSTRACT

An electronic device includes a memory, a communication interface capable of performing communication, and a processor electrically connected to the memory and the communication interface. The processor is configured to extract a first audio signal to be output through a speaker, based on audio data received from an external electronic device and/or stored in the memory, to generate a second audio signal obtained by removing the first audio signal from the audio data, and to generate a haptic signal for outputting a haptic effect, based on the second audio signal.

20 Claims, 17 Drawing Sheets

(51) Int. Cl.
*G10L 21/06* (2013.01)
*H04N 13/332* (2018.01)
*H04R 1/10* (2006.01)
*G10L 21/0208* (2013.01)

(56) References Cited

U.S. PATENT DOCUMENTS

| | | | |
|---|---|---|---|
| 9,448,626 B2* | 9/2016 | Cruz-Hernandez | G06F 3/016 |
| 9,898,085 B2* | 2/2018 | Saboune | G10L 21/16 |
| 2003/0067440 A1* | 4/2003 | Rank | G06F 3/016 |
| | | | 345/156 |
| 2009/0231276 A1 | 9/2009 | Ullrich et al. | |
| 2014/0292501 A1* | 10/2014 | Lim | G08B 6/00 |
| | | | 340/407.2 |
| 2015/0293592 A1* | 10/2015 | Cheong | G06F 3/016 |
| | | | 345/173 |

OTHER PUBLICATIONS

Christoph Matthias Nelke et al., "Dual Microphone Wind Noise Reduction by Exploiting the Complex Coherence", ITG-Fachbericht 252: Speech Communication, Sep. 24-26, 2014, 4 pages.

Masanori Kato et al., "A Wind-Noise Suppressor Based on Wind-Onset Detection and Spectral Gain Modification", IEEE, 2014 14th International Workshop on Acoustic Signal Enhancement (IWAENC), 5 pages.

Akihiko Sugiyama et al., "A Wind-Noise Suppressor With Wind-Burst Detection Based on a Stationary Noise Estimate", 2015 IEEE International Conference on Consumer Electronics (ICCE), 2 pages.

* cited by examiner

METHOD FOR PRODUCING HAPTIC SIGNAL AND ELECTRONIC DEVICE SUPPORTING THE SAME

CROSS-REFERENCE TO RELATED APPLICATION(S)

This application claims the benefit under 35 U.S.C. § 119(a) of Korean patent application assigned Serial number 10-2016-0162161, filed on Nov. 30, 2016 in the Korean Intellectual Property Office, the entire disclosure of which is hereby incorporated herein by reference.

FIELD

The present disclosure relates to a method of generating a haptic signal(s), which a user is able to sense, and/or an electronic device for generating a haptic signal(s).

BACKGROUND

Thanks to the increase in the resolution and the operating speed of an electronic device and the improvement of the performance of a graphic processing device, a device outputting virtual reality or a 3-dimensional stereoscopic image, which only a large-size device drives, has been miniaturized and lightened through a smart glass, a head mount device (hereinafter is referred to as a "HMD"), or the like.

For example, an HMD may be mounted on a user's head and may provide the effect of displaying a large screen in front of the user's eyes (e.g., the user's gaze). The HMD may be used to output a stereoscopic image. An augmented reality (AR) service or a virtual reality (VR) service using the HMD or a smartphone has been developed.

In addition, an electronic device may provide the user with haptic effects (or tangible effects) (e.g., vibration, motion, and the like) as well as visual effects and auditory effects, thereby improving the sense of presence.

SUMMARY

A conventional haptic device (or a device of tangible style) (e.g., HMD) may output a haptic effect (e.g., vibration generated depending on a specified timing signal) of a simple type when outputting a stereoscopic image. In this case, since the user feels a simple vibration, the user does not feel the sense of presence by various senses.

In accordance with an example aspect of the present disclosure, an electronic device includes a memory, a communication interface (including communication interface circuitry) capable of performing communication, and a processor electrically connected to the memory and the communication interface. The processor is configured: to extract a first audio signal to be output through a speaker, based at least on audio data received from an external electronic device and/or stored in the memory, to generate a second audio signal obtained by removing the first audio signal from the audio data, and to generate a haptic signal for outputting a haptic effect, based at least on the second audio signal.

Other aspects, advantages, and salient features of the disclosure will become apparent to those skilled in the art from the following detailed description, which, taken in conjunction with the annexed drawings, discloses various embodiments of the present disclosure.

According to various example embodiments of the present disclosure, a haptic signal producing method and/or an electronic device supporting the same may produce a haptic signal(s) based at least on a signal (e.g., a wind noise) that has been removed as a noise signal.

According to various example embodiments of the present disclosure, a haptic signal producing method and an electronic device supporting the same may produce a haptic signal by reflecting various features such as the intensity, the frequency, or the like of a wind noise, and then may provide the user with a haptic effect of various forms. Accordingly, the user feels the sense of presence at a point in time when the user captures an image by using a camera or a camcorder, when the user admires the image.

According to various embodiments of the present disclosure, a haptic signal producing method and an electronic device supporting the same may produce and transmit a haptic signal, which allows a user to feel the sense of presence, by using a circuit executing an existing function to reduce a wind noise.

BRIEF DESCRIPTION OF THE DRAWINGS

The above and other aspects, features, and example advantages of certain embodiments of the present disclosure will be more apparent from the following description taken in conjunction with the accompanying drawings, in which like reference numerals indicate like parts throughout the several views, wherein.

Throughout the drawings, it should be noted that like reference numbers are used to depict the same or similar elements, features, and structures.

DETAILED DESCRIPTION

Figure 1:
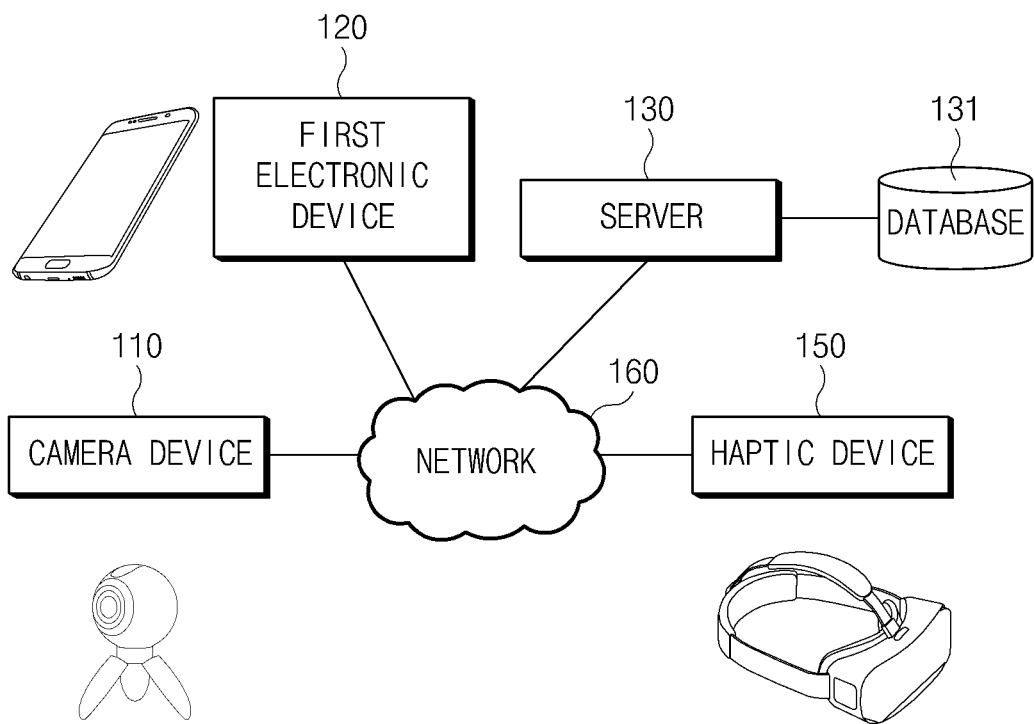
FIG. 1 illustrates an image output system, according to various embodiments.

Hereinafter, various example embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices such as a blood glucose meter, a heart rate measuring device, a blood pressure measuring device, and/or a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to example embodiments of the present disclosure will be described with reference to the accompanying drawings. The term "user" used herein may refer to a person who uses an electronic device or may refer to a device (for example, an artificial electronic device) that uses an electronic device.

FIG. 1 illustrates an image output system, according to various example embodiments.

Referring to FIG. 1, an image output system 100 may include a camera device 110, a first electronic device 120, a server 130, a database 131, and a haptic device 150, which may be connected through a network 160.

The camera device 110 may include a lens, an image sensor, and the like and may capture an image of the surrounding area. The camera device 110 may collect video data and audio data at the same time. In various example embodiments, the camera device 110 may include a sensor module (e.g., a GPS, a gyroscope, an accelerometer, a geomagnetic sensor, or the like). The camera device 110 may collect motion data (e.g., movement, slope, direction, or the like) while the video data or the audio data is collected.

The camera device 110 may store the collected video data, the collected audio data, and/or the collected motion data in internal memory, and/or may stream the collected video data, the collected audio data, or the collected motion data to an external device.

According to various example embodiments, the camera device 110 may include a plurality of image sensors (e.g., a first image sensor and a second image sensor) and a plurality of lenses through which light is concentrated on an image sensor. For example, the first image sensor and a first lens may capture a first image having angle of view of 180 degrees or more in a first direction, and the second image sensor and a second lens may capture a second image having angle of view of 180 degrees or more in a second direction opposite to the first direction. Accordingly, the camera device 110 may obtain an image of 360 degrees.

According to various example embodiments, the camera device 110 may include one or more microphones (or a microphone array). The camera device 110 may collect an ambient sound through a microphone to generate audio data. The audio data may include various sounds such as a sound output together with an image, an ambient sound, a noise sound, and the like. In the case where the camera device 110 includes the plurality of microphones, the plurality of microphones may be disposed to be spaced apart by a specified distance. The audio data collected through a plurality of microphones may be used to analyze the feature of a sound.

According to various example embodiments, the camera device 110 may include a processor (e.g., AP or MCU) for an operation to collect video data, audio data, and/or motion data, and may include a communication interface (including communication interface circuitry) that transmits the collected data to an external device.

The first electronic device 120 may generate a stereoscopic image (e.g., an image of 360 degrees) based on information (video data, audio data, motion data, or the like) collected through the camera device 110. For example, the first electronic device 120 may receive a plurality of images corresponding to other gazes to perform an operation such as stitching for generating an equi-rectangular projection (ERP) image, texture mapping, or the like.

According to various example embodiments, the camera device 110 may be mounted in the first electronic device 120 or may be a camera module included in the first electronic device 120.

According to various example embodiments, the first electronic device 120 may generate haptic information based on the collected audio data. The first electronic device 120 may produce a haptic signal(s) to be output by the haptic device 150, based on the generated haptic information.

According to various example embodiments, the first electronic device 120 may include a communication interface, including communication interface circuitry, and may transmit a stereoscopic image (e.g., an image of 360 degrees) and/or the haptic signal to the haptic device 150 through the communication interface.

According to various example embodiments, the first electronic device 120 may be a device coupled to the haptic device 150. For example, the first electronic device 120 may be coupled to the housing-type haptic device 150, via at least network 160. The first electronic device 120 may output the stereoscopic image through a display, and the user may mount an HMD-type haptic device 150 on the user's head for example to admire the stereoscopic image output through the display of the first electronic device 120. In this case, the first electronic device 120 may provide a user with various tangible effects such as vibration or the like, depending on the generated haptic signal.

According to various example embodiments, the first electronic device 120 may transmit information such that an image and/or a sound is capable of being output through the display and/or speakers of the haptic device 150. For example, the first electronic device 120 may transmit the haptic signal and/or image information to the haptic device 150. The haptic device 150 may output the haptic effect and/or may provide the user with an image and/or a sound, based on the signal or information received from the first electronic device 120.

According to various example embodiments, the server 130 may perform at least part of operations performed by and/or attributed to the first electronic device 120. For example, the server 130 may perform an operation such as stitching for generating an equi-rectangular projection (ERP) image, texture mapping, and/or the like. The server 130 may have a relatively high computing power and may reduce time required to process a stereoscopic image. The server 130 may transmit the processed stereoscopic image and/or haptic signal to the haptic device 150.

The haptic device 150 may play the stereoscopic image (e.g., an image of 360 degrees). The haptic device 150 may include a display, one or more speakers capable of outputting a sound, one or more haptic modules capable of outputting a haptic effect, a communication interface (including communication interface circuitry) capable of receiving video data, audio data, motion data, and/or the like from an external device, a processor for computation, and the like.

The haptic device 150 may provide a user with various tangible effects based on the received haptic signal. For example, the haptic device 150 may be a wearable device such as an HMD, a wrist mounting device, or the like. For another example, the haptic device 150 may be an object, which may be disposed at a periphery of the user and which is contactable to the user's body, such as a moving chair or a vibration table.

The haptic device 150 may include one or more actuators and may drive the actuators based on at least the haptic signal that is received from the outside or is produced therein.

For example, the haptic device 150 may be the HMD and may include a module(s) that generates a haptic effect, such as a vibration, a wind, recoil, tilting, and/or the like, in/at the user's head part. For another example, the haptic device 150 may include a headphone-type module that generates the haptic effect (e.g., a tremor, vibration, or rotation effect) at a periphery of the user's head and/or ears.

For another example, the haptic device 150 may be a chair-type device that generates a haptic effect such as shake, vibration, tilting, rotation, or the like. For another example, the haptic device 150 may be in the form, which is worn on the body, such as a glove or suit, or may be in the form of a hand held controller.

The haptic device 150 may include various types of electronic devices that provide the tangible effect to the user. Hereinafter, the case where the haptic device 150 is an HMD will be described. However, embodiments of the present disclosure are not limited thereto.

According to various example embodiments, the network 160 may be a direct communication network (Bluetooth, Wi-Fi direct, or the like) between devices, or cellular communication network such as 3G, LTE, or the like.

Figure 2:
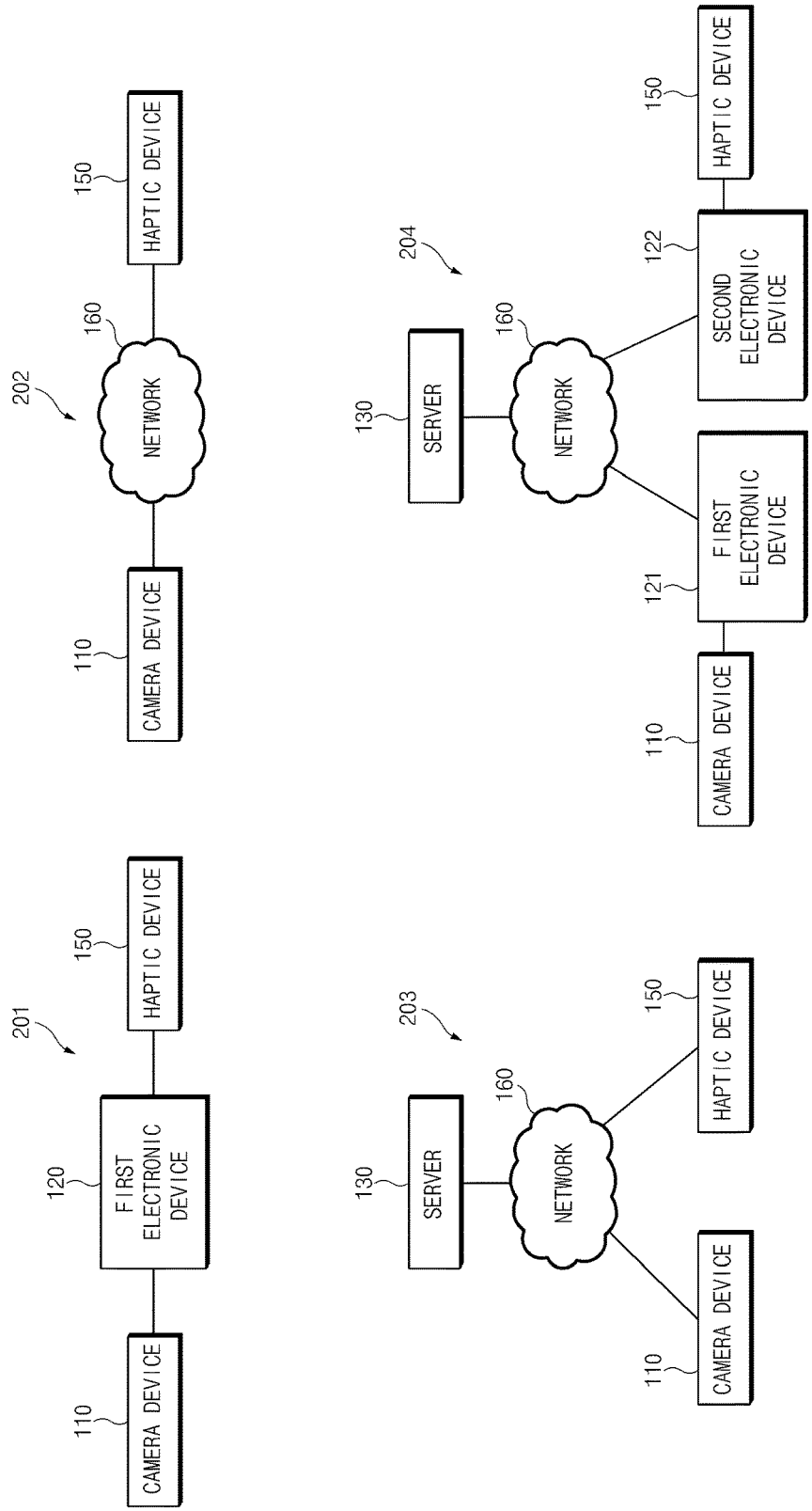
FIG. 2 illustrates various connection methods between a camera device and a haptic device, according to various embodiments.

FIG. 2 illustrates various connection methods between a camera device and a haptic device, according to various example embodiments.

Referring to FIG. 2, in a connection type 201, the camera device 110 and the haptic device 150 may be connected through the first electronic device 120.

The first electronic device 120 may receive video data, audio data, or motion data, which is collected by the camera device 110. The first electronic device 120 may produce a stereoscopic image composed of the video data and the audio data. In addition, the first electronic device 120 may generate haptic attribute information and a haptic signal based at least on the data received from the camera device 110.

The first electronic device 120 may transmit the generated haptic signal to the haptic device 150 and may control the haptic device 150 to generate a haptic effect (e.g., vibration, movement, the generation of wind, or the like).

In a connection type 202, the camera device 110 and the haptic device 150 may be connected through the network 160. The network 160 may be short distance communication network such as direct connection between devices (Bluetooth or Wi-Fi direct) or the like, or may be medium/long distance communication network such as LTE communication, or the like. A 3-dimensional stereoscopic image may be made or a haptic signal may be generated, by one of the camera device 110 and/or the haptic device 150. For example, the haptic device 150 may receive video data, audio data, or motion data, which is collected by the camera device 110. The haptic device 150 may generate haptic attribute information and a haptic signal based on the received data.

In a connection type 203, the camera device 110 and the haptic device 150 may be connected through the server 130 and/or network 160. The server 130 may receive video data, audio data, or motion data, which is collected by the camera device 110. The server 130 may produce a stereoscopic image composed of the video data and the audio data. In addition, the server 130 may generate haptic attribute information and a haptic signal based at least on the data received from the camera device 110. The server 130 may transmit the stereoscopic image or the haptic signal to the haptic device 150, optionally via network 160.

In a connection type 204, the camera device 110 may operate in conjunction with a first electronic device 120/121. The haptic device 150 may operate in conjunction with a second electronic device 122. The first electronic device 121 and the second electronic device 122 may be connected through the server 130 and/or network 160.

The first electronic device 121 may receive video data, audio data, or motion data, which is collected by the camera device 110. The first electronic device 121 may transmit the received data to the server 130, optionally via network 160. The server 130 may produce a stereoscopic image composed of the video data and the audio data. In addition, the server 130 may generate haptic attribute information and a haptic signal.

The second electronic device 122 may receive the stereoscopic image and the haptic signal from the server 130, optionally via network 160. The second electronic device 122 may transmit the received haptic signal to the haptic device 150 and may control the haptic device 150 to generate a haptic effect (e.g., vibration, movement, the generation of wind, or the like).

Figure 3:
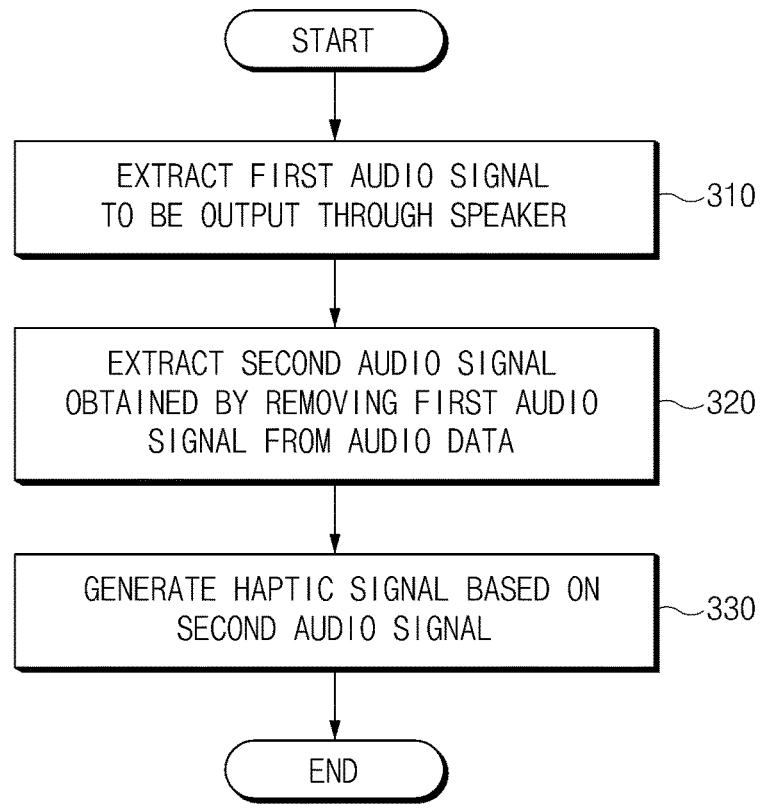
FIG. 3 is a flowchart illustrating a haptic signal producing method, according to various embodiments.

FIG. 3 is a flowchart illustrating a haptic signal producing method, according to various example embodiments. The haptic signal producing method of FIG. 3 may be performed by one or more of the camera device 110, the first electronic device 120, the server 130, and/or the haptic device 150 in FIG. 1.

Referring to FIG. 3, in operation 310, the processor(s) (e.g., AP or MCU) of an electronic device (e.g., one or more of the camera device 110, the first electronic device 120, the server 130, and/or the haptic device 150 in FIG. 1) may extract a first audio signal to be output through a speaker, based on audio data that is received from an external electronic device and/or stored in a memory. For example, the audio data may be data collected through the camera device 110. For another example, the audio data may be data loaded from an internal memory, depending on a specified condition (e.g., relevance to video data).

The first audio signal may be a signal obtained by removing a noise signal, such as a wind noise, a background noise, and/or the like, from the audio data. The first audio signal may be a signal for outputting a sound played to a user through a speaker.

In operation 320, the processor may extract a second audio signal obtained by at least removing the first audio signal from the audio data. The second audio signal may be a signal including at least part of a noise signal such as a wind noise, a background noise, and/or the like.

In operation 330, the processor may generate a haptic signal based on the second audio signal. For example, the generated haptic signal may be used such that the haptic device 150 generates a haptic effect (e.g., vibration, shake, the generation of a wind, inertia effects, and/or the like) and provides the user with the haptic effect. Additional information about a method for generating the haptic signal based on the second audio signal will be given with reference to FIGS. 4 to 9.

Figure 4:
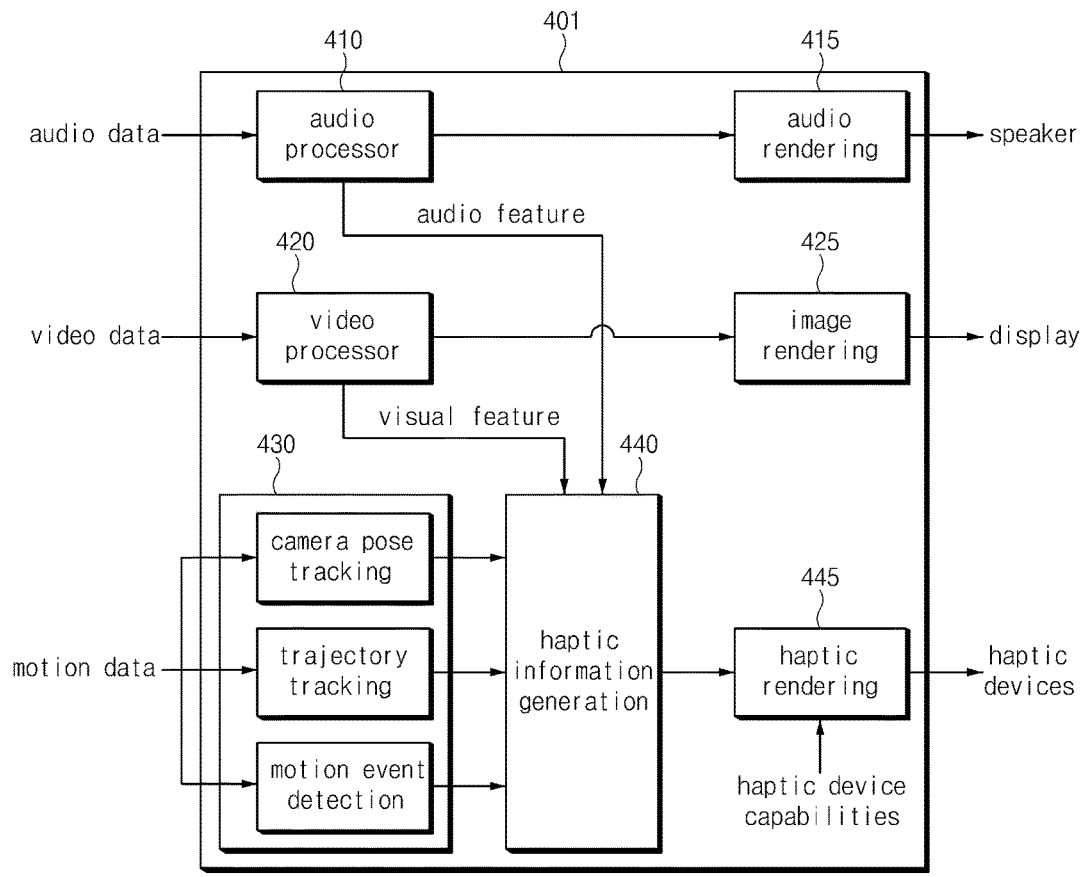
FIG. 4 illustrates an electronic device, according to various embodiments.

FIG. 4 illustrates an electronic device 401, according to various embodiments. An electronic device 401 may be one of the camera device 110, the first electronic device 120, the server 130, and the haptic device 150 in FIG. 1.

Referring to FIG. 4, the electronic device 401 may receive video data, audio data, and motion data from the camera device 110. The video data, the audio data, and the motion data may be collected through the camera device 110 in FIG. 1.

The electronic device 401 may include an audio processor 410, an audio rendering unit 415, a video processor 420, a video rendering unit 425, a motion processor 430, a haptic information generating unit 440, and a haptic rendering unit 445. The elements of the electronic device 401 may be separated depending upon function. However, embodiments of the present disclosure are not so limited. For example, the operations of the audio processor 410, the video processor 420, the motion processor 430, and/or the haptic information generating unit 440 may be performed by one processor (e.g., AP or MCU) in an example embodiment. In another example, the operations of audio processor 410, video processor 420, and motion processor 430 may be performed by one processor. In another example, the operation of audio processor 410 and video processor 420 may be performed by a single processor. In another example, the operations of audio processor 410 and motion processor 430 may be performed by a single processor. Haptic rendering unit 445 and/or haptic information generator 440 may also be part of any of the aforesaid processors.

The audio processor 410 may receive and process the audio data. The audio data may be collected through the camera device 110 of FIG. 1 together with the video data or may be data recorded independently of the video data. The audio processor 410 may generate a first audio signal, which is to be transmitted to the audio rendering unit 415 through signal processing (e.g., noise cancellation, microphone array processing, gain control, DOA detection, compression, or the like) assigned to the audio data. The first audio signal may be a noise canceling signal obtained by removing noise data (e.g., a specific frequency component) from the input audio data. The first audio signal may be a signal for generating a sound output to the user's ears through a speaker.

According to various example embodiments, the audio processor 410 may extract a second audio signal (e.g., a noise, a wind noise, an ambient noise, or the like) obtained by removing the first audio signal (e.g., voice (a person's voice), a sound, the source of which is the closest to a microphone) from the input audio data. The audio processor 410 may transmit the second audio signal (audio feature) to the haptic information generating unit 440. For example, the second audio signal may be a wind noise extracted from the audio data. Additional information about the second audio signal generated by the audio processor 410 may be given with reference to FIG. 5.

The audio rendering unit 415 may receive the first audio signal from the audio processor 410. The audio rendering unit 415 may convert the first audio signal to a sound (e.g., 5.1 ch signal or 7.1 ch signal) that allows the user to feel the three-dimensional spatial sensation and may output the sound through the speaker.

The video processor 420 may process the input video data so as to output the processed data to a display. The video processor 420 may provide the processed data to the video rendering unit 425. In various embodiments, the video processor 420 may extract feature information (visual feature) from the input video data and may transmit the extracted feature information to the haptic information generating unit 440.

According to various example embodiments, the video processor 420 may transform a stereoscopic image (e.g., rotation transformation, distortion transformation, or the like) or may reduce the shake of the stereoscopic image, by reflecting information (e.g., camera pose, trajectory information, or the like) processed by the motion processor 430.

The video rendering unit 425 may render a three-dimensional stereoscopic image based on the video data processed by the video processor 420. For example, the video rendering unit 425 may form a virtual three-dimensional space associated with an area at which the user looks through a HMD, and a periphery of the corresponding area.

The motion processor 430 may calculate camera pose information, trajectory information, and/or motion event information based on the input motion data. For example, the motion processor 430 may calculate the camera pose or the translation (e.g., transposition and/or transformation) of the camera device 110, based on the input motion data (e.g., data collected by GPS, gyroscopes, accelerometers, and/or magnetic field sensors).

The motion processor 430 may calculate trajectory information (or movement trajectory information) of the user based on translation information. The trajectory information may include information about a movement direction, a speed, or the like at a point of a specific time interval.

The motion processor 430 may transmit the camera pose information and/or the trajectory information to the haptic information generating unit 440. The haptic information generating unit 440 may determine and/or change an attribute of a haptic event based on the transmitted information. For example, the haptic information generating unit 440 may determine an output direction of a haptic event (or a haptic effect) generating a wind, based on the trajectory information.

According to various example embodiments, the motion processor 430 may detect a motion event (e.g., a collision event, a shake, or the like) based on the motion data. The motion processor 430 may determine whether the motion event occurs, by calculating how much the motion data coincides with pre-stored motion pattern information. The haptic information generating unit 440 may determine or change the attribute of the haptic event based on the determined motion event.

The haptic information generating unit 440 may generate the haptic information based on the second audio signal and feature information of an image, camera pose information, trajectory information, or motion event information. The haptic information may include information about the time information (occurrence time, occurrence timing, duration, or the like), type (e.g., vibration, shake, or compression/decompression), intensity, direction, or the like of the haptic effect.

According to various example embodiments, the haptic information generating unit 440 may receive the audio data from the audio processor 410 and may reflect the audio data to the generation of the haptic information.

According to various example embodiments, the haptic information generating unit 440 may determine the attribute of the haptic information based on the second audio signal (e.g., a wind noise signal) received from the audio processor 410. For example, the haptic information generating unit 440 may determine a type (e.g., a sound when the window of a vehicle is opened during driving, a breeze, a sound generated according to high-speed movement, a skiing sound, a sound generated when the user boards a ship, or the like) of the wind noise, based on the acoustic feature (spectral characteristic, cepstral characteristic, sound pressure level (SPL), periodicity, or the like) of the wind noise. The haptic information generating unit 440 may determine the attribute (e.g., haptic pattern) of the haptic event based on a type of the wind noise. Additional information about an operation of the haptic information generating unit 440 may be given with reference to FIG. 6.

The haptic rendering unit 445 may generate a haptic signal to be transmitted to the haptic device 150, based on the haptic information generated by the haptic information generating unit 440. The haptic rendering unit 445 may generate a haptic signal(s), which is to be played by haptic device(s), based on the attribute(s) of the haptic device(s) (e.g., a wind generator, a vibrator, and an inertial device) to be connected to the generated haptic information. For example, when generating the haptic signal, the haptic rendering unit 445 may use pose information of the haptic device 150 (in the case where there is direction information in the haptic event). Additional information about the haptic rendering unit 445 may be given with reference to FIG. 7.

Figure 5:
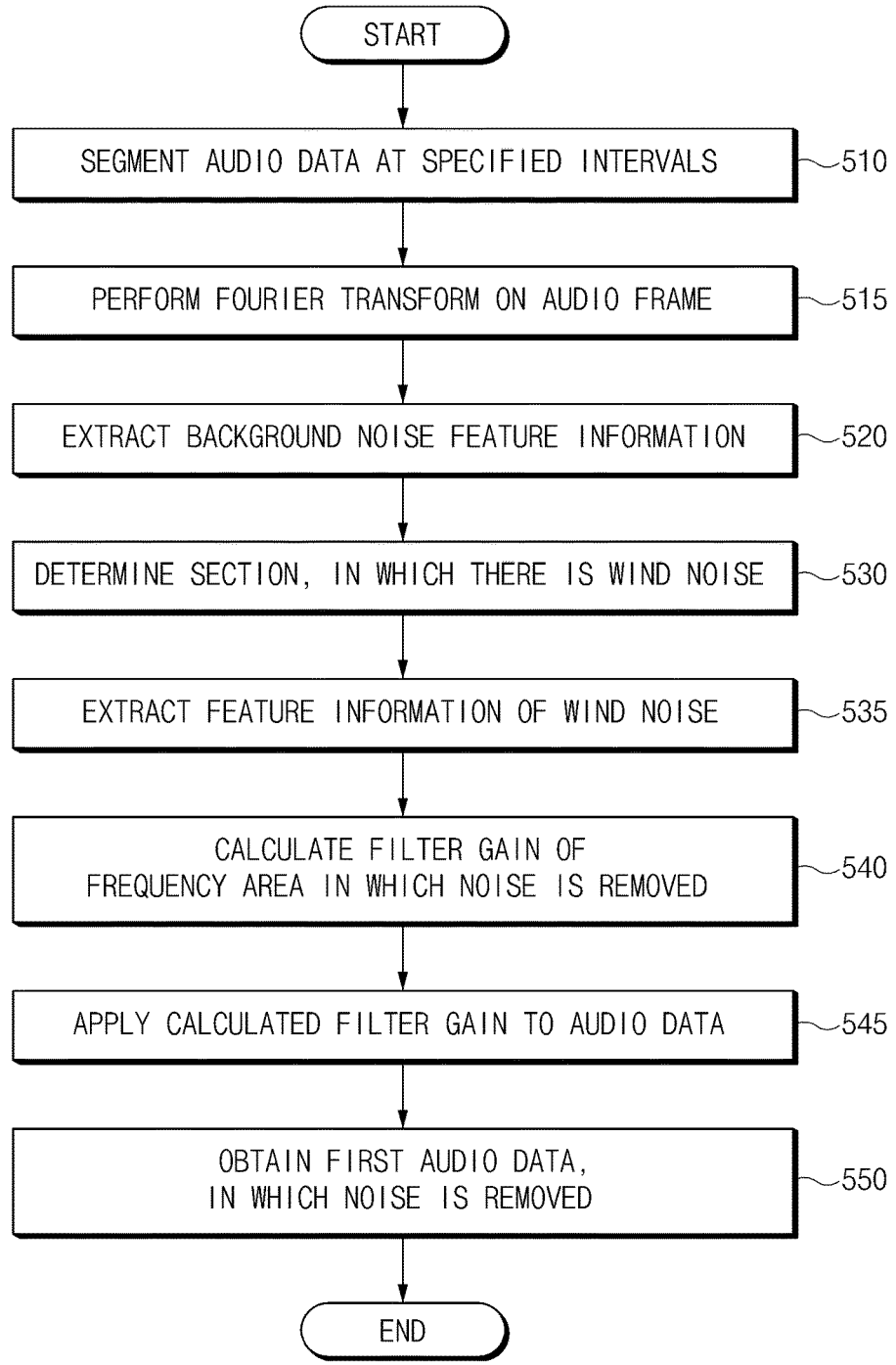
FIG. 5 is a flowchart illustrating an operation of an audio processor, according to various embodiments.

FIG. 5 is a flowchart illustrating an operation of an audio processor, according to various example embodiments.

Referring to FIG. 5, in operation 510, the audio processor 410 may segment input audio data at specified intervals. Each of the segmented pieces of audio data (hereinafter referred to as an "audio frame") may be at least partly overlapped in time. For example, the length of the audio frame may be 10 msec, and an overlapping section may be 5 msec.

In operation 515, the audio processor 410 may perform Fourier transform on each audio frame to convert the audio frame to a frequency signal. Each audio frame may be expressed as magnitude information and phase information of the frequency signal.

In operation 520, the audio processor 410 may extract background noise feature information based on a statistical feature of pieces of magnitude information corresponding to another audio frame different from the current audio frame. For example, the background noise feature information may be a signal to noise ratio (SNR) for each frequency.

In operation 530, the audio processor 410 may determine a section, in which there is a wind noise, based on the statistical feature of pieces of magnitude information corresponding to another audio frame different from the current audio frame.

In operation 535, the audio processor 410 may extract wind noise feature information about the section in which there is a wind noise. For example, the wind noise feature information may become the SNR for each frequency. Herein, noise N of the SNR may be the wind noise.

According to various example embodiments, the audio processor 410 may determine a frequency feature of the wind noise based on the wind noise feature information. For example, in the case where the wind noise feature information is the SNR for each frequency, the frequency feature of the wind noise may be determined by using the SNR for each frequency and the magnitude information.

According to various example embodiments, the audio processor 410 may generate a feature value such as cepstrum, a spectral slope, or the like through additional processing of the frequency feature of the wind noise. The audio processor 410 may determine a type of the wind noise based on the feature value.

According to various example embodiments, the background noise and the wind noise may be processed together without any distinction. The background noise and the wind noise may be processed as a single noise. The sound feature obtained by combining the background noise and the wind noise may be used to generate the haptic information. In this case, the audio processor 410 may generate a feature value such as Mel-frequency cepstral coefficients (MFCC), cepstrum, or the like with regard to a sound obtained by combining the background noise and the wind noise. The haptic information may be generated based on the feature value.

In operation 540, the audio processor 410 may calculate the filter gain of a frequency area, to be used to remove a noise for example, based at least on the calculated background noise feature information and the calculated wind noise feature information.

In operation 545, the audio processor 410 may apply the calculated filter gain to the audio data.

In operation 550, the audio processor 410 may obtain first audio data, in which the noise is removed, by applying inverse Fourier transform or the like. The first audio signal may be obtained through overlap-add.

Figure 6:
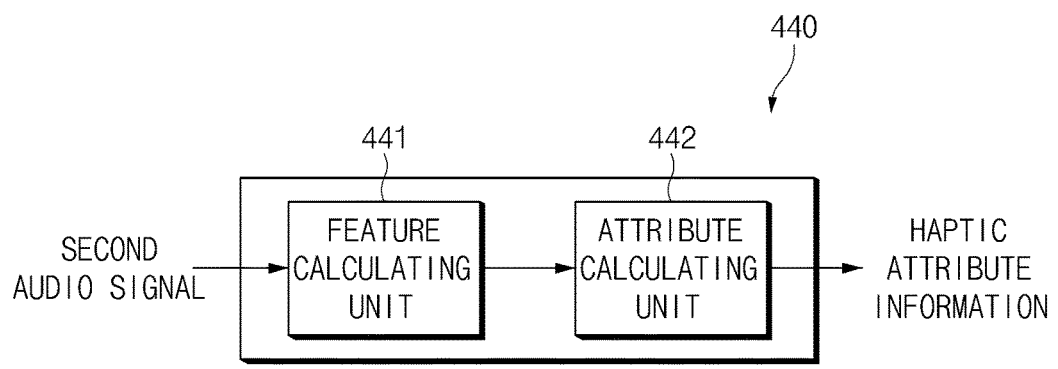
FIG. 6 illustrates a configuration of a haptic information generating unit, according to various embodiments.

FIG. 6 illustrates a configuration of a haptic information generating unit 440, including haptic information generating circuitry, according to various example embodiments.

Referring to FIG. 6, the haptic information generating unit 440 may determine the attribute(s) of a haptic event based on a feature value(s) (e.g., acoustic feature) of a second audio signal (e.g., a noise signal). The haptic event may be a pre-defined signal pattern that allows the haptic effect to occur through the haptic device 150. The haptic event may be defined or set in the various forms.

A second audio signal may be a signal obtained by removing a first audio signal (e.g., a person's voice, a sound having a specified pattern, a sound heard most loudly by a microphone, a sound analyzed as being generated closest to a microphone, or the like), which is to be output through a speaker, from audio data that is received from an external electronic device or is stored in a memory. The second audio signal may include a background sound, a wind sound, or the like that is classified as a noise signal.

Haptic attribute information may be information for setting a type, a duration (start time, end time), a persistence mode (intensity increase, intensity decrease), or the like of a haptic effect (e.g., an effect to generate vibration, inertia, shake, or the like).

According to various example embodiments, the haptic information generating unit 440 may include a feature calculating unit 441 and an attribute calculating unit 442. If the second audio signal (e.g., a noise signal) is detected, the feature calculating unit 441 may extract an acoustic feature value of a noise.

In an example embodiment, the feature calculating unit 441 may segment the second audio signal at a preset time period to generate a plurality of audio frames. Each of a plurality of audio frames may have a section in which each of the plurality of audio frames overlaps another audio frame of a previous time period or a later time period. For example, the N-th audio frame may have a length of 10 ms, may have a section (the same data section) of 5 ms in which the N-th audio frame overlaps the (N−1)-th audio frame, and may have a section of 5 ms in which the N-th audio frame overlaps the (N+1)-th audio frame.

In an example embodiment, the feature calculating unit 441 may measure SPL associated with each of the audio frames. The attribute calculating unit 442 may determine the intensity of a haptic event corresponding to the measured SPL.

In an example embodiment, the feature calculating unit 441 may calculate a feature value (e.g., MFCC, a spectral slope, or the like) associated with each of a plurality of audio frames. For example, the feature calculating unit 441 may perform Fourier transform on a plurality of audio frames and may calculate a power spectrum by using a filter bank of Mel-scale. The feature calculating unit 441 may calculate a log value associated with the power spectrum of each Mel-scale, may perform discrete cosine transform, and may calculate the MFCC.

In an example embodiment, the feature calculating unit 441 may detect an interaural time difference (ITD) and/or an interaural level difference (ILD) of a second audio signal collected through a microphone array. The attribute calculating unit 442 may calculate the direction of a wind by using the detected ITD and/or ILD.

The attribute calculating unit 442 may determine a type of a noise based on the feature value calculated by the feature calculating unit 441 and may assign a haptic device type to be output based on the type of the noise.

For example, a type of a wind noise may include arbitrary various types of sounds such as a sound when the window of a vehicle is opened during driving, a breeze, a sound according to high-speed movement, and a sound caused by rapidly changing a movement direction, and the like. The sound when the window of the vehicle is opened during driving and the breeze may be assigned to the haptic device 150 including a wind generator, and the sound due to fast movement or the change of direction may be assigned to the haptic device 150 such as a Galvanic stimulator that generates an inertia effect.

The attribute calculating unit 442 may determine a type of a haptic event and/or a pattern of a haptic effect by using an extracted feature value. For example, if variance of the MFCC is greater than a preset value, the attribute calculating unit 442 may set a change value of a vibration according to the haptic effect to be relatively great. On the other hand, if the variance of the MFCC is less than a preset value, the attribute calculating unit 442 may set a change value of a vibration according to the haptic effect to be relatively small.

According to various example embodiments, the attribute calculating unit 442 may calculate direction information of an input microphone based on information of a motion sensor (e.g., GPS, acceleration sensor, a gyro sensor, a geomagnetic sensor, a magnetic sensor, or the like). For example, the attribute calculating unit 442 may determine the direction of a haptic event based on the calculated direction information (camera pose) of the microphone and the calculated direction of the wind noise.

Figure 7:
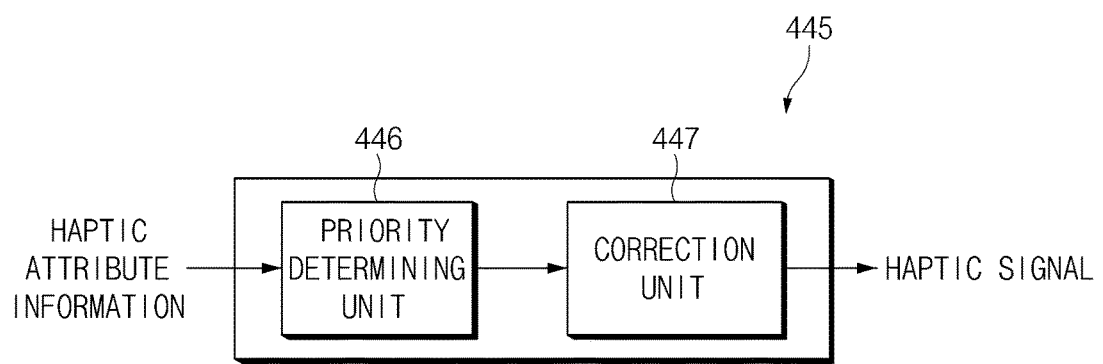
FIG. 7 illustrates a configuration of a haptic rendering unit, according to various embodiments.

FIG. 7 illustrates a haptic rendering unit 445, including haptic rendering circuitry, according to various example embodiments.

Referring to FIG. 7, the haptic rendering unit 445 may generate a haptic signal, which is to be played by one or more of the haptic device(s) 150, based on the generated haptic attribute information. The haptic rendering unit 445 may generate a stereoscopic haptic signal for driving the haptic device 150, based on the haptic attribute information. For example, in the case where a haptic effect output by the haptic device 150 is vibration, the haptic signal may include information about a drive start time, drive strength, a change in drive strength, a drive end time or the like of the vibrator. For another example, in the case where the haptic device 150 is a chair generating a shake, the haptic attribute information may include information about shake direction, shake strength, duration, or the like.

According to various example embodiments, the haptic information generated by the haptic information generating unit 440 may include information about a type of the haptic event, a haptic generating object, or the like, and may include information about a spatial location associated with the haptic event or the haptic generating object. The haptic attribute information may be input to the haptic rendering unit 445.

The haptic rendering unit 445 may select the haptic event (or a haptic object) to be played or may change the attribute of the haptic event, based at least on the location information of the haptic device 150 (e.g., HMD).

For example, in the case where the location information of the HMD is in a state ((latitude, longitude, height, orientation θ, orientation φ)=(37°, 127°0'0.00000", 0, 0°, 0°)), the intensity of the haptic event having haptic event coordinates (37°, 127°0'0.00001", 0, 0°, 0°) may be smaller than the intensity of the haptic event having haptic event coordinates (37°, 127°0'0.00002", 0, 0°, 0°).

For example, in the case where the location information of the HMD is in a state ((latitude, longitude, height, orientation θ, orientation φ)=(37°, 127°0'0.00000", 0, 0°, 0°)), the haptic event of haptic event coordinates (37°, 127°0'0.00000", 0, 0°, 0°) may generate a haptic effect on the right side of a user, and the haptic event of haptic event coordinate (37°, 127°0'0.00000", 0, 90°, 0°) may generate the haptic effect in front of the user.

According to various embodiments, the haptic rendering unit 445 may include a priority determining unit 446 and a correction unit 447.

In the case where the number of haptic events is plural, the priority determining unit 446 may assign the priority of each of the haptic events, based on the location information of the haptic device 150 (e.g., HMD).

For example, the priority determining unit 446, including priority determining circuitry, may set a haptic event, which is closest to a point corresponding to the gaze direction (including a HMD pose) of the user (or wearer), from among a plurality of haptic events using the haptic device 150 to the highest priority. The correction unit 447 may set a weight associated with haptic strength, based on the set priority. The haptic event close to the point corresponding to the gaze direction may have a relatively high weight, and the haptic event far away from the point corresponding to the gaze direction may have a relatively low weight. The haptic attribute information may be combined and generated based on the weight.

The correction unit 447, including correction circuitry, may finely adjust the haptic event. The correction unit 447 may correct the haptic attribute information based on the location information of the haptic device 150 (e.g., HMD) and/or the external information received from an external device. The external information may be provided online or offline through a web or various contents providers.

In an example embodiment, the external information may include weather information. The correction unit 447 may correct and/or add the haptic attribute information based on weather information. For example, in the case where it rains on the day of recording, the correction unit 447 may correct vibration haptic strength generated based on a sound to be relatively weak. In the case where the wind blows strongly on the day of recording, the correction unit 447 may correct wind haptic strength generated based on a sound to be relatively strong.

According to an embodiment, while collecting an image, a sound, or motion data by using a camera device, the external information may be generated based on the collected information at the same time. For example, the external information may be information collected at a point in time, when an image is captured, or information collected during operations such as editing, playback, and transmission after capturing the image.

Figure 8A:
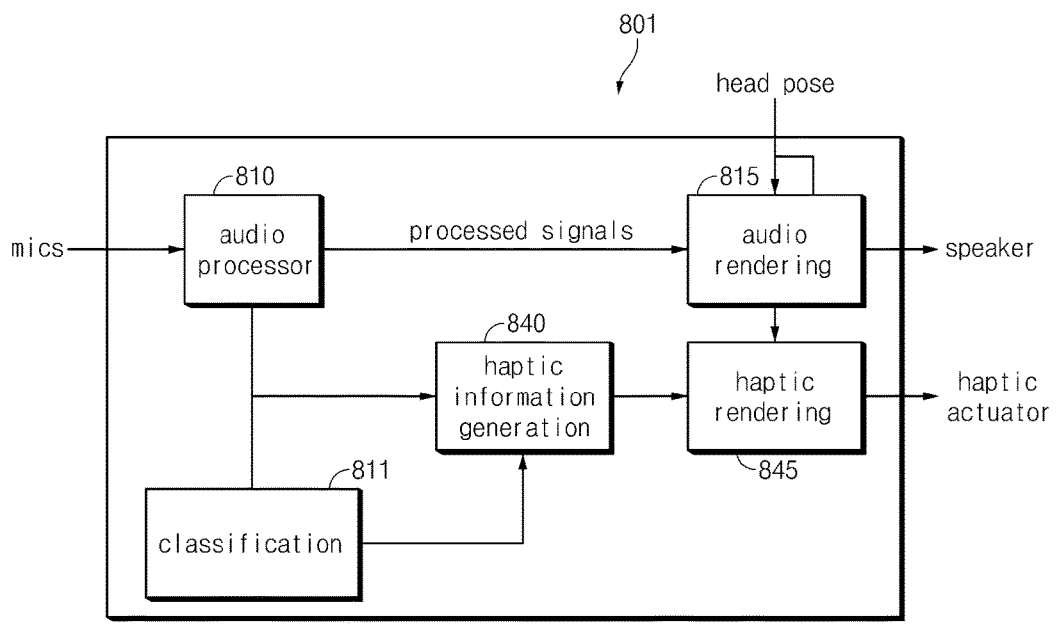
FIG. 8A is a block diagram of a camera device generating haptic attribute information, according to various embodiments.

FIG. 8A is a block diagram of a camera device (110 or 801) generating haptic attribute information, according to various example embodiments. In FIG. 8A, an embodiment is exemplified as a configuration that generates a haptic signal based on an audio signal. However, embodiments of the present disclosure are not limited thereto. Although not illustrated in FIG. 8A, a camera device 801 (110 or 801) may additionally include a configuration such as a lens, an image sensor, an image processing unit, or the like.

Referring to FIG. 8A, the camera device 801 (or 110) may capture an image through a camera and may generate a haptic signal using audio data recorded at the same time as the image capturing. The haptic signal may be directly transmitted to an external haptic device or may be transmitted to the external haptic device through another electronic device. The camera device 801 may include an audio processor 810, a classification unit 811, an audio rendering unit 815, a haptic information generating unit 840, and a haptic rendering unit 845 as a configuration processing the audio data. Some of all of these elements may be provided in one or more processors.

The audio processor 810 may receive the audio data collected through an embedded microphone of the camera device 801 or a separately mounted external microphone. The audio processor 810 may remove a noise signal from the audio data depending on a specified noise cancellation algorithm to extract a first audio signal to be transmitted to the audio rendering unit 815.

The classification unit 811 may receive a second audio signal obtained by removing the first audio signal from the audio data, from the audio processor 810. The classification unit 811 may classify the second audio signal depending on a specified tone and/or a frequency feature. For example, the classification unit 811 may separate a wind noise from a background noise.

The operations of the audio rendering unit 815, the haptic information generating unit 840, and the haptic rendering unit 845 may be the same as and similar to the operations of the audio rendering unit 415, the haptic information generating unit 440, and the haptic rendering unit 445 in FIG. 4 and/or FIG. 5 above, respectively.

Figure 8B:
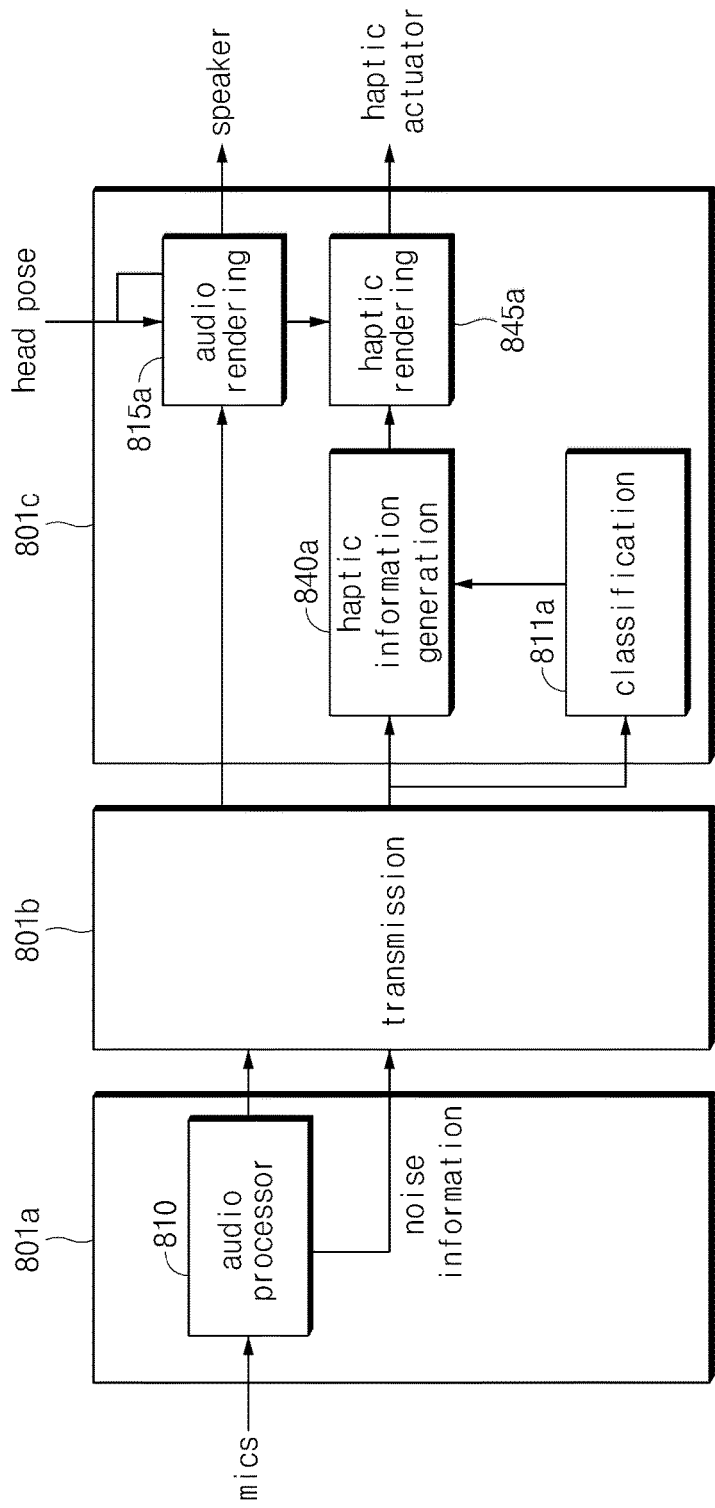
FIG. 8B is a view generating a haptic signal through an external device separated from a camera device, according to various embodiments.

FIG. 8B is a schematic view illustrating generating a haptic signal through an external device separated from a camera device, according to various example embodiments.

Referring to FIG. 8B, a camera device 801a may include the audio processor 810 as a configuration for processing audio data. The audio processor 810 may receive the audio data collected through an embedded microphone of the camera device 801a or a separately mounted external microphone. The audio processor 810 may generate the first audio signal and the second audio signal. The audio processor 810 may remove the noise signal from the audio data depending on a specified noise cancellation algorithm to generate the first audio signal and may generate the second audio signal obtained by removing the first audio signal from the audio data.

The camera device 801a may transmit the first audio signal and the second audio signal to an external device 801c through a transmission network/device 801b (e.g., a wired/wireless network).

For example, the external device 801c may be an electronic device (e.g., a smartphone) operating in conjunction with a haptic device (e.g., HMD), or may be, for another example, a server. The external device 801c may include a classification unit 811a, an audio rendering unit 815a, a haptic information generating unit 840a, and a haptic rendering unit 845a as a configuration for processing the audio data. The operations of the classification unit 811a, the audio rendering unit 815a, the haptic information generating unit 840a, and the haptic rendering unit 845a may be the same as and similar to the operations of the classification unit 811, the audio rendering unit 815, the haptic information generating unit 840, and the haptic rendering unit 845 discussed above in connection with FIG. 8A, respectively.

Figure 9A:
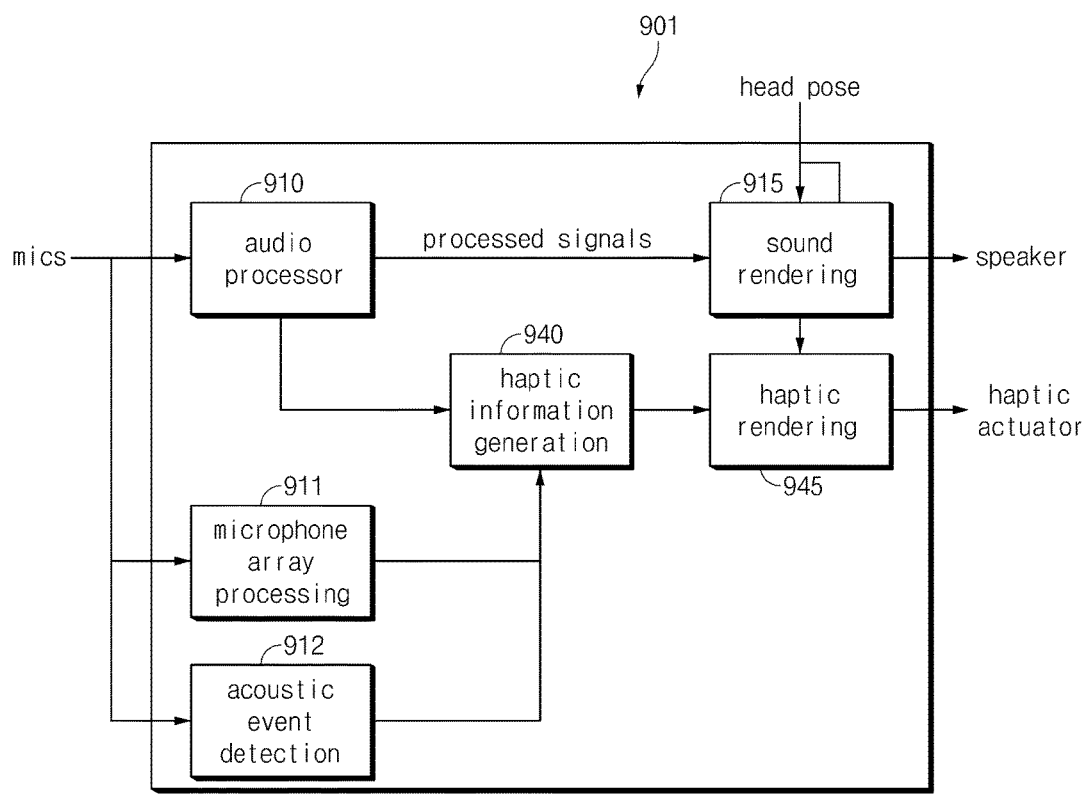
FIG. 9A illustrates a camera device that generates a haptic signal by using a sound collected through a microphone array, according to various embodiments.

FIG. 9A illustrates a camera device 901 that generates a haptic signal by using sound collected through a microphone array, according to various example embodiments. In FIG. 9A, an embodiment is exemplified as a configuration that generates a haptic signal based on an audio signal. However, embodiments of the present disclosure are not limited thereto. Although not illustrated in FIG. 9A, a camera device 901 may additionally include a configuration such as a lens, an image sensor, an image processing unit, and/or the like.

Referring to FIG. 9A, the camera device 901 may generate a haptic signal based on audio data input by using a microphone array (a plurality of microphones).

In an example embodiment, the camera device 901 may include an audio processor 910, an analysis unit 911, a detection unit 912, an audio rendering unit 915, a haptic information generating unit 940, and a haptic rendering unit 945 as a configuration for processing the audio data. All of these may be part of a single, or multiple, processor(s).

The audio processor 910 may receive audio data collected through the microphone array (the plurality of microphones). The audio data collected through the microphone array may have an audio feature more complex than audio data collected by using a single microphone. A distance between an object generating a sound and each of microphones may be different from each other, and the audio data collected through each of microphones may have a feature different from each other.

The audio processor 910 may remove a noise signal from the audio data depending on a specified noise cancellation algorithm to extract the first audio signal to be transmitted to the audio rendering unit 915. The audio processor 910 may remove the first audio signal from the audio data to extract the second audio signal and may transmit the second audio signal to each of the analysis unit 911 and the detection unit 912.

The analysis unit 911 may detect direction information (ITD, ILD, Generalized Sidelobe Canceller (GSC), Minimum Variance, or the like) of a sound from the second audio signal to transmit the direction information to the haptic information generating unit 940. The detection unit 912 may detect a time section according to a preset pattern or frequency feature from the second audio signal to transmit information about the corresponding section to the haptic information generating unit 940.

According to various example embodiments, the analysis unit 911 and the detection unit 912 may analyze a sound feature by using the audio data before the noise removal process or the audio data generated during the noise removal process.

The operations of the audio rendering unit 915, the haptic information generating unit 940, and the haptic rendering unit 945 may be the same as and similar to the operations of the audio rendering unit 415, the haptic information generating unit 440, and the haptic rendering unit 445 in FIG. 4, respectively.

Figure 9B:
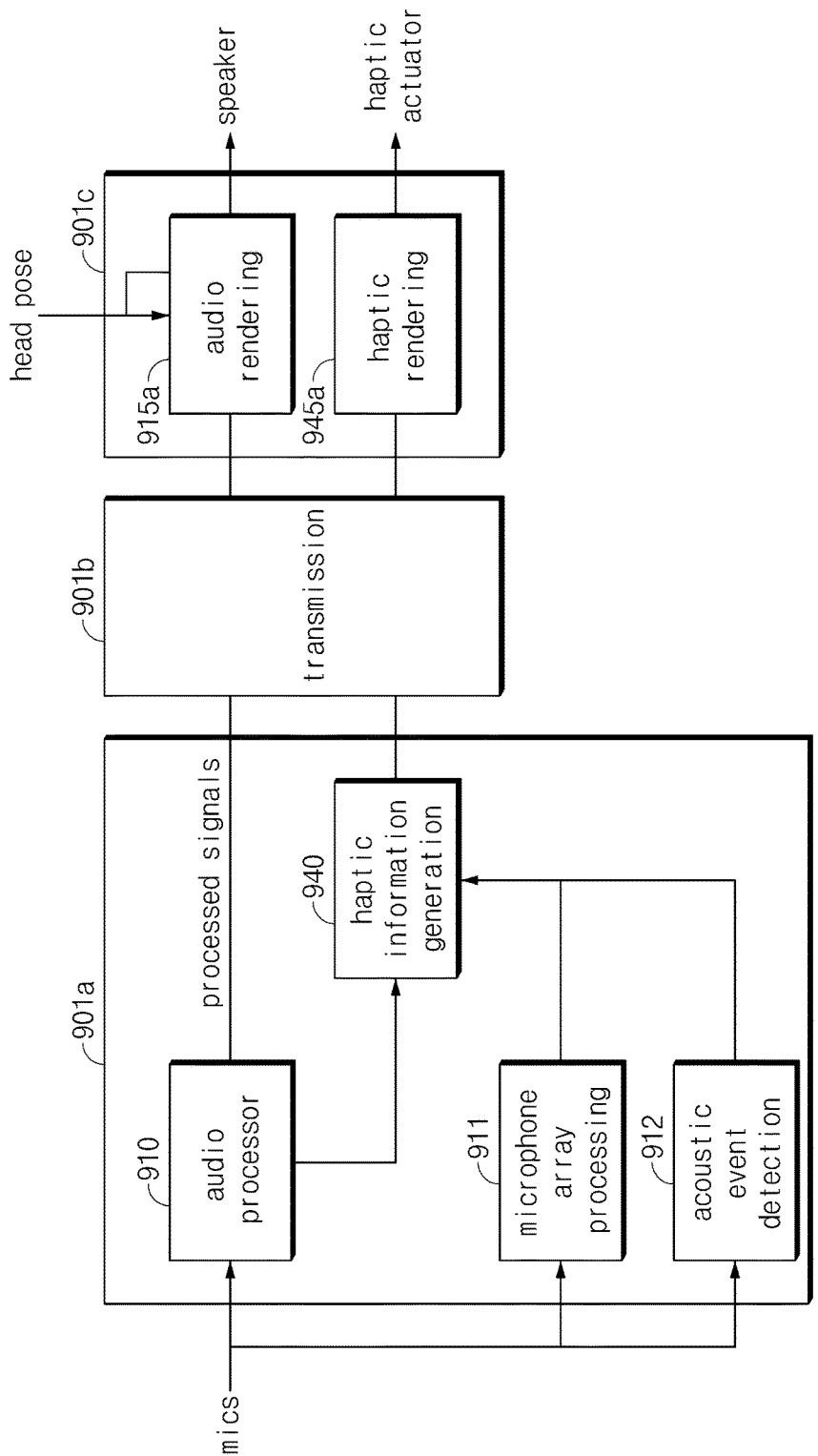
FIG. 9B is a view generating a haptic signal through an external device separated from a camera device, according to various embodiments.

FIG. 9B is a schematic view for generating a haptic signal through an external device separated from a camera device, according to various example embodiments.

Referring to FIG. 9B, a camera device 901a may include the audio processor 910, the analysis unit 911, the detection unit 912, and the haptic information generating unit 940 as a configuration for processing the audio data. The operations of the audio processor 910, the analysis unit 911, the detection unit 912, and the haptic information generating unit 940 may be the same as and similar to the operations of the corresponding configuration in FIG. 9A.

The audio processor 910 may remove a noise signal from audio data collected through a plurality of microphones depending on a specified noise cancellation algorithm to generate the first audio signal. The audio processor 910 may generate the second audio signal obtained by removing the first audio signal from the audio data. The haptic information generating unit 940 may generate haptic attribute information based on the second audio signal analyzed through the analysis unit 911 and the detection unit 912.

The camera device 901a may transmit the first audio signal and the haptic attribute information to an external device 901c through a transmission network/device 901b (e.g., a wired/wireless network).

For example, the external device 901c may be an electronic device (e.g., a smartphone) operating in conjunction with a haptic device (e.g., HMD), or may be, for another example, a server. The external device 901c may include an audio rendering unit 915a and a haptic rendering unit 945a as a configuration processing the audio data. The operations of the audio rendering unit 915a and the haptic rendering unit 945a may be the same as and similar to the operations of the audio rendering unit 915 and the haptic rendering unit 945 in FIG. 9A, respectively.

According to various example embodiments, a haptic signal producing method performed by an electronic device includes extracting a first audio signal to be output through a speaker, based on audio data received from an external electronic device or stored in the memory, generating a second audio signal obtained by removing the first audio signal from the audio data, and generating a haptic signal for outputting an haptic effect, based on the second audio signal.

According to various example embodiments, the extracting of the first audio signal includes removing a noise signal from a plurality of audio frames depending on a specified noise cancellation algorithm to extract the first audio signal.

According to various example embodiments, the generating of the haptic signal includes segmenting the second audio signal at a preset time period to generate a plurality of audio frames, and performing SPL on the plurality of audio frames to determine intensity of the haptic effect.

According to various example embodiments, the generating of the haptic signal includes calculating MFCC and/or a spectral slope of each of a plurality of audio frames.

According to various example embodiments, the generating of the haptic signal includes if variance of the MFCC is greater than a preset value, setting a change value of vibration according to the haptic effect to a specified value or more, and/or if variance of the MFCC is less than the preset value, setting the change value of vibration according to the haptic effect to the specified value or less.

According to various example embodiments, the generating of the second audio signal includes receiving additional information associated with the audio data from an external device, and correcting the haptic signal based on the additional information.

Figure 10A:
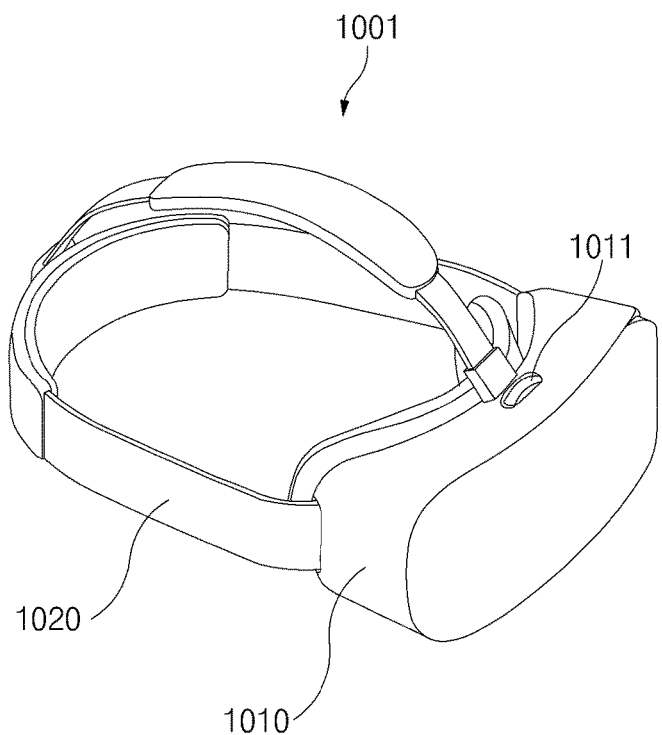
FIG. 10A illustrates an external configuration of a haptic device, according to various embodiments.

FIG. 10A illustrates an external configuration of a haptic device, according to various example embodiments.

In FIG. 10A, a haptic device 1001 is an HMD. However, embodiments of the present disclosure are not limited thereto. For example, the haptic device 1001 may have a shape such as glasses.

Referring to FIG. 10A, the haptic device 1001 may be contacted or worn on/over both eyes of a user, and may be a device that displays an image. The haptic device 1001 may provide at least one of a see-through method providing augmented reality (AR) or a see-closed method providing virtual reality (VR).

The see-through method may provide additional information or an image in real time as one image while transmitting real external images to the user's eyes through a display.

The see-through method may provide visual effects or various sensory effects to the object or the virtual target or object while transmitting real external object(s) to the user's eyes through the display or a transparent/translucent lens. The haptic device 1001 may provide the user with additional information and/or an image about a real object through a see-through function. In an example embodiment, the haptic device 1001 may provide the user with additional information by using hologram or the like without the display or the lens.

The see-closed method may provide only contents provided through the display without passing through an external object, as an image.

According to various example embodiments, the haptic device 1001 may collect sensing data for recognizing a periphery of the haptic device 1001 or the user, from an embedded sensor. In addition, the haptic device 1001 may receive sensing data collected from an external source (e.g., an external device, an external server, or the like).

The haptic device 1001 may trace and interpret a wearer's physical head by using sensing data to set a relation between the wearer's physical body and a physical environment surrounding the wearer.

The haptic device 1001 may allow the wearer's TFOV to be classified into various areas, by tracing the wearer's physical head with regard to the wearer's body and an ambient environment. The area may be defined with regard to the body of the wearer of a HMD and an ambient environment. The haptic device 1001 may provide a system capable of arranging a virtual object or a virtual image with regard to the wearer's body and the ambient environment.

Generally, the virtual object may be disposed to be spaced apart from a first area or may be disposed in an unobtrusive area such that the virtual image is presented in the non-dangerous manner to reduce the visual occlusion of the first area. The virtual object may be disposed to be spaced apart from the first area to provide a context (e.g., to classify information as less relevance, less importance, or the like).

According to various example embodiments, the haptic device 1001 may include a main frame 1010 and a mounting part 1020 capable of fixing the main frame 1010 to the head of a user. The main frame 1010 may include an adjusting part 1011 for adjusting a display output. The mounting part 1020 may include a band formed of an elastic material and may allow the main frame 1010 to contact and/or be provided over eyes of the user's face.

The main frame 1010 may include at least one of a display or a transparent/translucent lens therein. In the case where the main frame 1010 includes the display, the display may be fixed to the main frame 1010 or may be removable. A lens assembly may be inserted between the display and the user's eye.

According to various example embodiments, the haptic device 1001 may include a wireless communication component providing a wireless communication function to communicate with a companion device (e.g., a smartphone), a server, or another network component. In an example embodiment, the haptic device 1001 may classify an area of TFOV of the wearer through a cloud-based service and may arrange the virtual object in the area. The haptic device 1001 may be configured to communicate with the server device directly or may communicate with the server device through the companion device (e.g., a smartphone or any other device) that is a local device compared with the wearer.

The haptic device 1001 may provide at least one of a see-through function providing AR or a see-closed function providing VR.

Figure 10B:
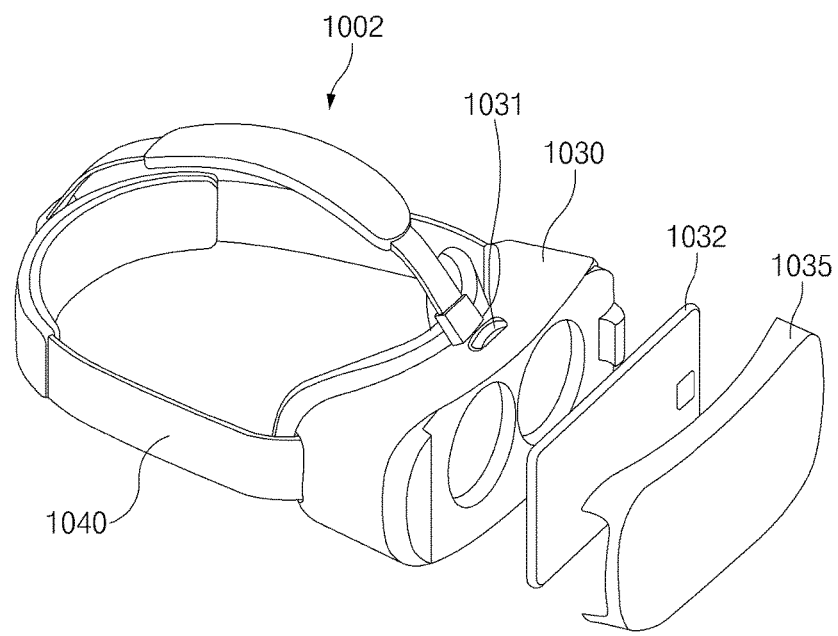
FIG. 10B illustrates an appearance of a removable type haptic device, according to various embodiments.

FIG. 10B illustrates an appearance of a removable type haptic device, according to various example embodiments.

Referring to FIG. 10B, a haptic device 1002 may include a main frame 1030, a display device 1032, a cover part 1035, and a mounting part 1040 capable of fixing the main frame 1030 to a user's head. The main frame 1030 may include an adjusting part 1031 for adjusting a display output.

The main frame 1030 may include a space or a structure for containing the display device 1032 (e.g., LCD, OLED, LED, etc.). In addition, the main frame 1030 may further include a connector that is coupled to an electrical connection unit of a terminal and allows the main frame 1030 to communicate with the terminal.

According to various example embodiments, the main frame 1030 may include, for example, a touch panel on a part of the exterior thereof, as a user interface. The touch panel may include one or more display location adjusting parts or lens adjusting parts (not illustrated) on the external surface of the main frame 1030.

For example, the main frame 1030 may include other type of a control device that controls the display device 1032 on the side surface thereof. For example, the control device may include at least one of a physical key, a physical button, a touch key, a joystick, a wheel key, a touch pad, or the like.

The touch pad may display a graphical user interface (GUI) capable of controlling a function of the terminal. (e.g., a GUI for controlling a sound or an image). The touch pad may receive a touch input (an input through a direct touch or a hovering input) of a user.

The main frame 1030 may be connected to the display device 1032 through an interface such as USB or the like, and the touch input that the touch panel receives may be transmitted to the display device 1032. The display device 1032 may control a function corresponding to the touch input, in response to the touch input that the touch panel receives. For example, the display device 1032 may adjust a volume or may control the video playback, in response to the received touch input.

The main frame 1030 may include a face contact part (not illustrated) that contacts a user's face, inside the main frame 1030. The face contact part may have a structure corresponding to curvature of the user's face and may at least partly include an elastic body. A part of the face contact part may include a nose recess having a shape into which the user's nose is inserted. A lens assembly that includes at least one lens may be inserted into a part of the face contact part, which is a location which the user's eyes face. When the user wears the haptic device 1002, at least one surface of a lens may be exposed to the face contact part such that the user watches a screen of a display device with the user's eye.

The main frame 1030 may be implemented with a relatively lightweight material (e.g., plastic) for wearing comfort of the user. The main frame 1030 may include at least one of various other materials (e.g., glass, ceramic, metal (e.g., aluminum) or metal alloy (e.g., steel, stainless steel, titanium, or magnesium alloy)) for the strength and beauty.

One surface of the main frame 1030 may include a storage space in which the display device 1032 is capable of being mounted. A part forming the storage space may include the elastic material. The storage space may include a flexible material so as to change the size of the space, and may be equipped with the display device 1032 having various sizes.

The display device 1032 may be a device, which is used after being mounted in the haptic device 1002 or which independently operates after being separated from the haptic device 1002. A lens assembly may be inserted between the display device 1032 and the user's eye.

Figure 10C:
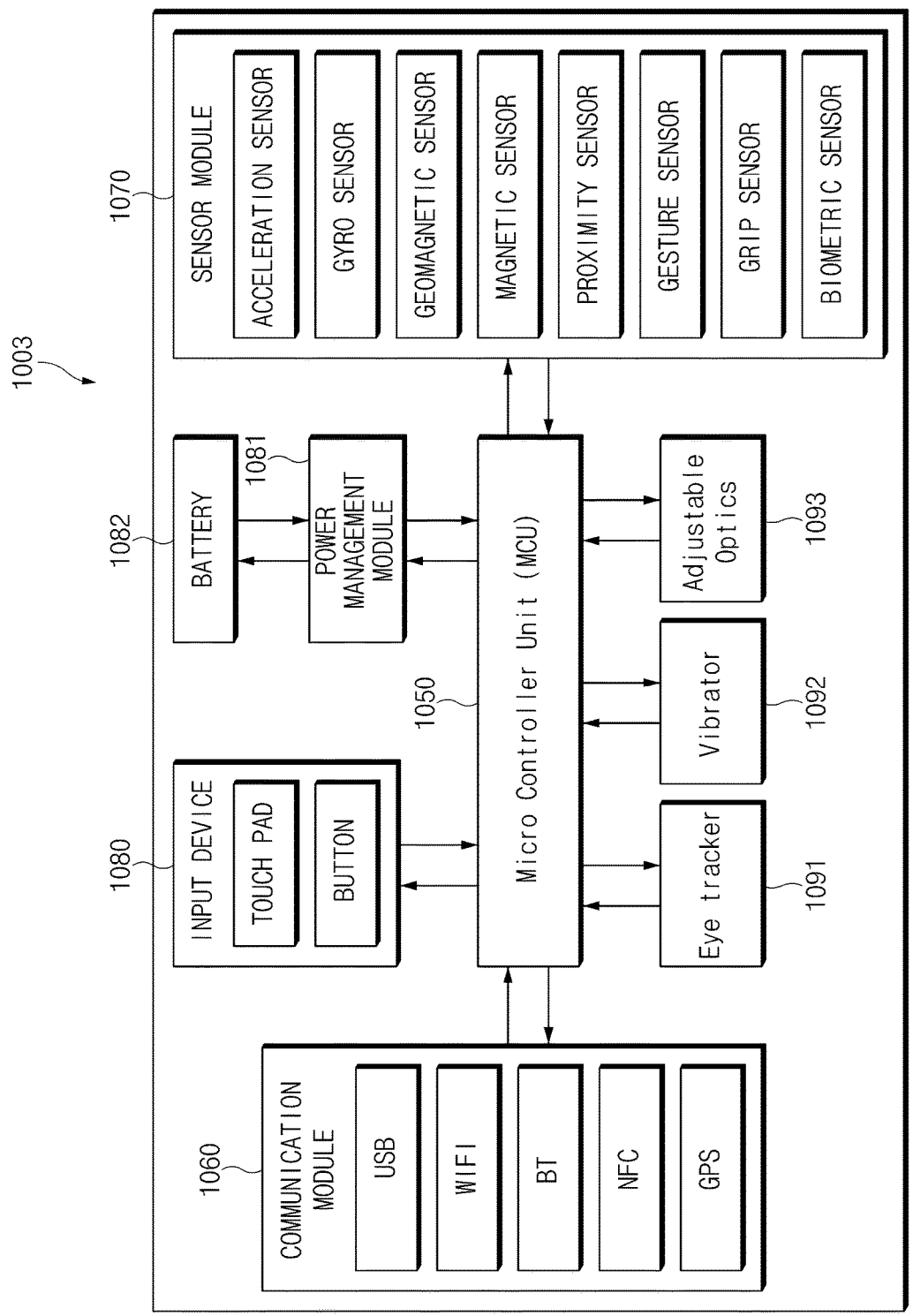
FIG. 10C is a block diagram illustrating an internal configuration of a haptic device, according to various embodiments.

FIG. 10C is a block diagram illustrating an internal configuration of a haptic device, according to various example embodiments. FIG. 10C is, but is not limited to, an example.

Referring to FIG. 10C, a haptic device 1003 may include micro controller unit (MCU) 1050, a communication module 1060 including communication circuitry, a sensor module 1070 including sensor circuitry, an input device 1080 including input circuitry, a power management module 1081, an eye tracker 1091, a vibrator 1092, and an adjustable optics 1093 (e.g., lens assembly). A part of elements of the haptic device 1003 may be included in a display device (e.g., a removable smartphone) in a main frame.

The MCU 1050 may include, for example, a processor and may control a plurality of hardware elements connected to the MCU 1050 by driving an operating system (OS) and/or an embedded software program.

The communication module 1060 may electrically connect the main frame of the haptic device 1003 to a smartphone by using wired and/or wireless communication and may transmit and receive data. The communication module 1060 may include a USB module, a Wi-Fi module, a BT module, a NFC module, or a GPS module. At least part (e.g., two or more) of the Wi-Fi module, the BT module, the GPS module, or the NFC module may be included in one integrated circuit (IC) or an IC package.

The sensor module 1070 may measure a physical quantity or may detect an operation state of the haptic device 1003; the sensor module 1070 may convert the measured or detected information to an electrical signal. For example, the sensor module 1070 may include at least one of an acceleration sensor, a gyro sensor, a geomagnetic sensor, a magnetic sensor, a proximity sensor, a gesture sensor, a grip sensor, or a biometric sensor. The haptic device 1003 may detect the movement of a head of a user (wearer), by using the acceleration sensor, the gyro sensor, and the geomagnetic sensor. The haptic device 1003 may sense whether it is worn, by using the proximity sensor or the grip sensor. At least part of elements of the sensor module 1070 may be included in a removable smartphone.

The input device 1080 may include a touch pad and/or a button. The touch pad may recognize a touch input based on at least one of a capacitive detecting method, a resistive detecting method, an infrared detecting method, or an ultrasonic detecting method. Moreover, the touch pad may further include a control circuit. In the case of a capacitive detecting method, a physical contact or proximity recognition may be possible. The touch pad may further include a tactile layer. In this case, the touch pad may provide a tactile reaction to a user. The button may include, for example, a physical button, an optical key, or a keypad.

For example, the eye tracker 1091 may track the user's gaze by using at least one method of an electrical oculography (EOG) sensor, coil systems, dual purkinje systems, bright pupil systems, or dark pupil systems. In addition, the eye tracker 1091 may further include a micro camera for the eye tracking.

The adjustable optics 1093 may measure the inter-pupil distance (IPD) of a user and may adjust a distance of a lens and a location of the display of a smartphone such that the user admires an image suitable for his/her eyesight.

Figure 11:
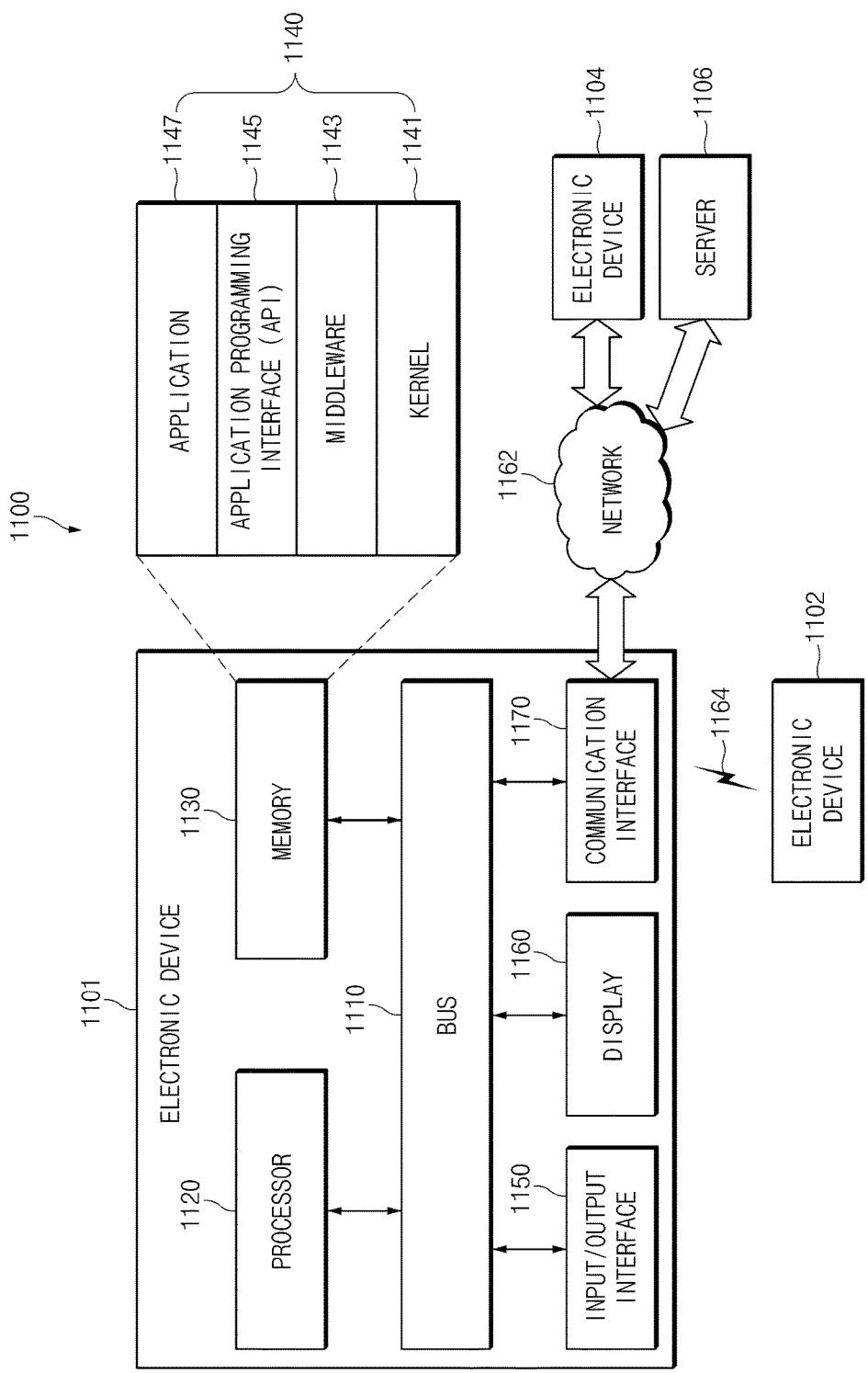
FIG. 11 illustrates a network including an electronic device, according to various embodiments.

FIG. 11 illustrates an electronic device in a network environment according to an example embodiment of the present disclosure.

An electronic device 1101 in a network environment 1100 according to various example embodiments of the present disclosure will be described with reference to FIG. 11. The electronic device 1101 may include a bus 1110, a processor 1120, a memory 1130, an input/output interface 1150 including interface circuitry, a display 1160, and a communication interface 1170 including communication interface circuitry. In various example embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a central processing unit (CPU), an application processor (AP), and/or a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, a kernel 1141, middleware 1143, an application programming interface (API) 1145, and/or an application program (or an application) 1147. At least a portion of the kernel 1141, the middleware 1143, and/or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 and/or the middleware 1143, may include, for example, at least one interface or function (e.g., instructions) for file control, window control, image processing, character control, or the like.

The input/output interface 1150 may serve to transfer an instruction or data input from a user and/or another external device to (an)other element(s) of the electronic device 1101. Furthermore, the input/output interface 1150 may output instructions or data received from (an)other element(s) of the electronic device 1101 to the user or another external device.

The display 1160 may include, for example, a liquid crystal display (LCD), a light-emitting diode (LED) display, an organic light-emitting diode (OLED) display, a microelectromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1164. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1101 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1162 may include at least one of telecommunications networks, for example, a computer network (e.g., local area network (LAN) or wide area network (WAN)), the Internet, or a telephone network.

The types of the first external electronic device 1102 and the second external electronic device 1104 may be the same as or different from the type of the electronic device 1101. According to an example embodiment of the present disclosure, the server 1106 may include a group of one or more servers. A portion or all of operations performed in the electronic device 1101 may be performed in one or more other electronic devices (e.g., the first electronic device 1102, the second external electronic device 1104, and/or the server 1106). When the electronic device 1101 should perform a certain function or service automatically or in response to a request, the electronic device 1101 may request at least a portion of functions related to the function or service from another device (e.g., the first electronic device 1102, the second external electronic device 1104, and/or the server 1106) instead of or in addition to performing the function or service for itself. The other electronic device (e.g., the first electronic device 1102, the second external electronic device 1104, or the server 1106) may perform the requested function or additional function, and may transfer a result of the performance to the electronic device 1101. The electronic device 1101 may use a received result itself or additionally process the received result to provide the requested function or service. To this end, for example, a cloud computing technology, a distributed computing technology, or a client-server computing technology may be used.

Figure 12:
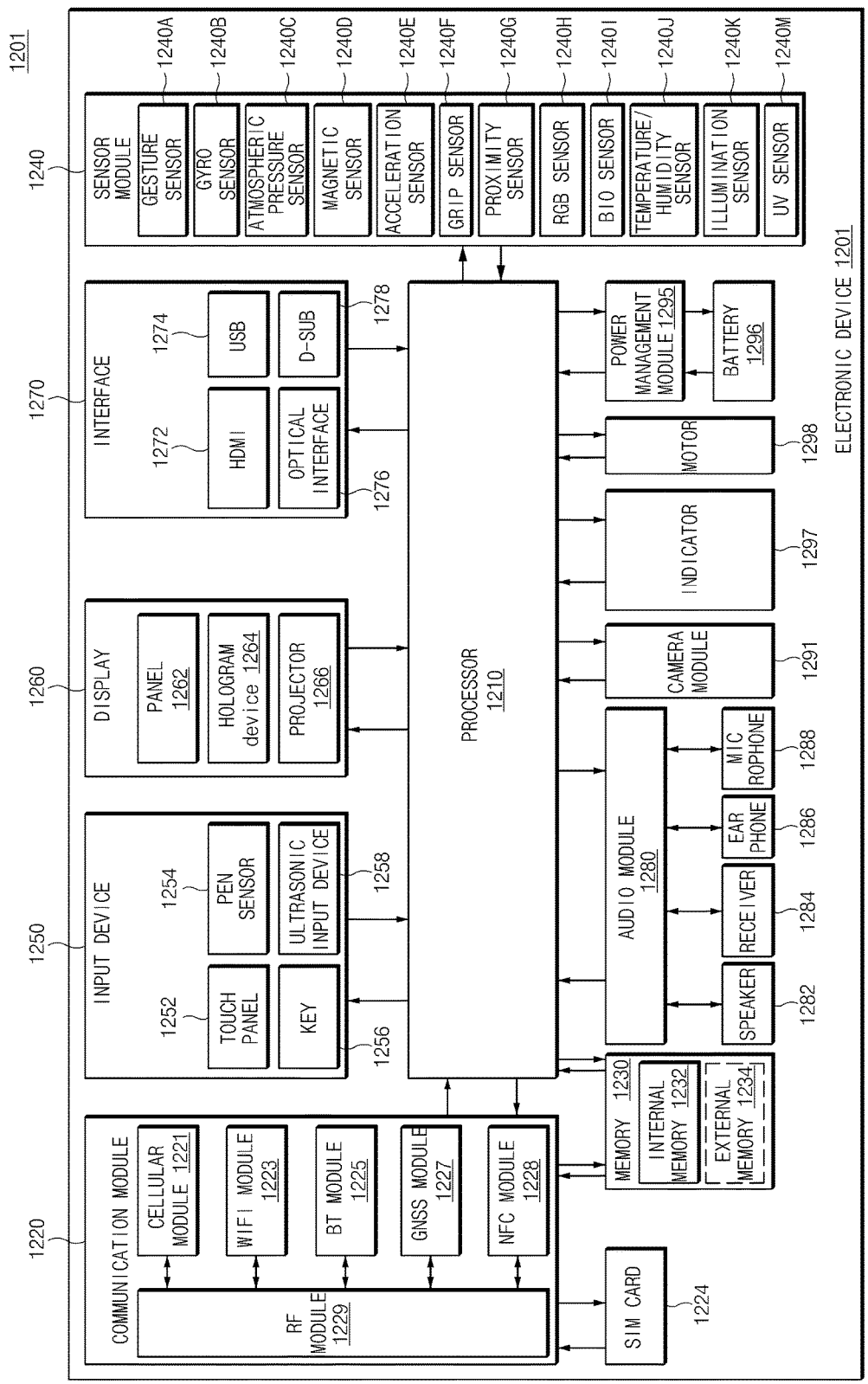
FIG. 12 illustrates a block diagram of the electronic device according to various embodiments.

FIG. 12 is a block diagram illustrating an electronic device according to an example embodiment of the present disclosure.

Referring to FIG. 12, an electronic device 1201 may include, for example, a part or the entirety of the electronic device 1101 illustrated in FIG. 11. The electronic device 1201 may include at least one processor (e.g., AP) 1210, a communication module 1220 including communication circuitry, a subscriber identification module (SIM) 1224, a memory 1230, a sensor module 1240 including sensing circuitry, an input device 1250 including input circuitry, a display 1260, an interface 1270 including interface circuitry, an audio module 1280, a camera module 1291, a power management module 1295, a battery 1296, an indicator 1297, and a motor 1298.

The processor 1210 may run an operating system or an application program so as to control a plurality of hardware or software elements connected to the processor 1210, and may process various data and perform operations. The processor 1210 may be implemented with, for example, a system on chip (SoC). According to an example embodiment of the present disclosure, the processor 1210 may further include a graphic processing unit (GPU) and/or an image signal processor. The processor 1210 may include at least a portion (e.g., a cellular module 1221) of the elements illustrated in FIG. 12. The processor 1210 may load, on a volatile memory, an instruction or data received from at least one of other elements (e.g., a nonvolatile memory) to process the instruction or data, and may store various data in a nonvolatile memory.

The communication module 1220 may have a configuration that is the same as or similar to that of the communication interface 1170 of FIG. 11. The communication module 1220 may include, for example, a cellular module 1221, a Wi-Fi module 1223, a Bluetooth (BT) module 1225, a GNSS module 1227 (e.g., a GPS module, a GLONASS module, a BeiDou module, or a Galileo module), a NFC module 1228, and a radio frequency (RF) module 1229.

The cellular module 1221 may provide, for example, a voice call service, a video call service, a text message service, or an Internet service through a communication network. The cellular module 1221 may identify and authenticate the electronic device 1201 in the communication network using the subscriber identification module 1224 (e.g., a SIM card). The cellular module 1221 may perform at least a part of functions that may be provided by the processor 1210. The cellular module 1221 may include a communication processor (CP).

Each of the Wi-Fi module 1223, the Bluetooth module 1225, the GNSS module 1227 and the NFC module 1228 may include, for example, a processor for processing data transmitted/received through the modules. According to some various example embodiments of the present disclosure, at least a part (e.g., two or more) of the cellular module 1221, the Wi-Fi module 1223, the Bluetooth module 1225, the GNSS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another example embodiment of the present disclosure, at least one of the cellular module 1221, the Wi-Fi module 1223, the Bluetooth module 1225, the GNSS module 1227, or the NFC module 1228 may transmit/receive RF signals through a separate RF module.

The SIM 1224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 (e.g., the memory 1130) may include, for example, an internal memory 1232 or an external memory 1234. The internal memory 1232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1234 may include a flash drive such as a compact flash (CF), a secure digital (SD), a Micro-SD, a Mini-SD, an extreme digital (xD), a MultiMediaCard (MMC), a memory stick, or the like. The external memory 1234 may be operatively and/or physically connected to the electronic device 1201 through various interfaces.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a (digital) pen sensor 1254, a key 1256, or an ultrasonic input device 1258. The touch panel 1252 may employ at least one of capacitive, resistive, infrared, and ultraviolet sensing methods. The touch panel 1252 may further include a control circuit. The touch panel 1252 may further include a tactile layer so as to provide a haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone 1288 so as to identify data corresponding to the ultrasonic waves sensed.

The display 1260 (e.g., the display 1160) may include a panel 1262, a hologram device 1264, or a projector 1266. The panel 1262 may have a configuration that is the same as or similar to that of the display 1160 of FIG. 11. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-subminiature (D-sub) 1278. The interface 1270, for example, may be included in the communication interface 1170 illustrated in FIG. 11. Additionally or alternatively, the interface 1270 may include, for example, a mobile high-definition link (MHL) interface, an SD card/multi-media card (MMC) interface, or an infrared data association (IrDA) interface.

The audio module 1280 may convert, for example, a sound into an electrical signal or vice versa. At least a portion of elements of the audio module 1280 may be included in the input/output interface 1150 illustrated in FIG. 11. The audio module 1280 may process sound information input or output through a speaker 1282, a receiver 1284, an earphone 1286, or the microphone 1288.

The camera module 1291 may be, for example, a device for shooting a still image or a video. According to an example embodiment of the present disclosure, the camera module 1291 may include at least one image sensor (e.g., a front sensor or a rear sensor), a lens, an image signal processor (ISP), or a flash (e.g., an LED or a xenon lamp).

The power management module 1295 may manage power of the electronic device 1201. According to an example embodiment of the present disclosure, the power management module 1295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various example embodiments, an electronic device includes a memory, a communication interface, and a processor electrically connected to the memory and the communication interface, wherein the processor is configured to extract a first audio signal to be output through a speaker, based on audio data received from an external electronic device or stored in the memory, generate a second audio signal obtained by removing the first audio signal from the audio data, and generate a haptic signal for outputting an haptic effect, based on the second audio signal.

According to various embodiments, the electronic device is one of a camera device, a haptic device, or a server device or is a device interlocking to control at least one of the camera device or the haptic device.

According to various embodiments, the processor is configured to segment the audio data at a preset time period to generate a plurality of audio frames, and perform Fourier transform on the plurality of audio frames.

According to various embodiments, the audio frame has a section in which the audio frame overlaps another audio frame of a time period before or after the audio frame.

According to various embodiments, the processor is configured to remove a noise signal from the plurality of audio frames depending on a specified noise cancellation algorithm to extract the first audio signal.

According to various embodiments, the second audio signal is a signal to noise ratio (SNR) for each frequency included in the plurality of audio frames.

According to various embodiments, the processor is configured to segment the second audio signal at a preset time period to generate a plurality of audio frames, and perform sound pressure level (SPL) on the plurality of audio frames to determine intensity of the haptic effect.

According to various embodiments, the processor is configured to analyze a statistical feature of the plurality of audio frames, and determine a type or an output method of the haptic effect.

According to various embodiments, the processor is configured to calculate Mel-frequency cepstral coefficients (MFCC) or a spectral slope of each of the plurality of audio frames.

According to various embodiments, the processor is configured to if variance of the MFCC is greater than a preset value, set a change value of vibration according to the haptic effect to a specified value or more.

According to various embodiments, the processor is configured to if variance of the MFCC is less than a preset value, set a change value of vibration according to the haptic effect to a specified value or less.

According to various embodiments, audio data is collected through a microphone array, and the processor is configured to detect an interaural time difference (ITD) and/or an interaural level difference (ILD) of the second audio signal.

According to various embodiments, the processor is configured to determine a direction of the haptic effect based on the detected ITD and/or ILD.

According to various embodiments, the processor is configured to receive additional information associated with the audio data from an external device, and correct the haptic signal based on the additional information.

Figure 13:
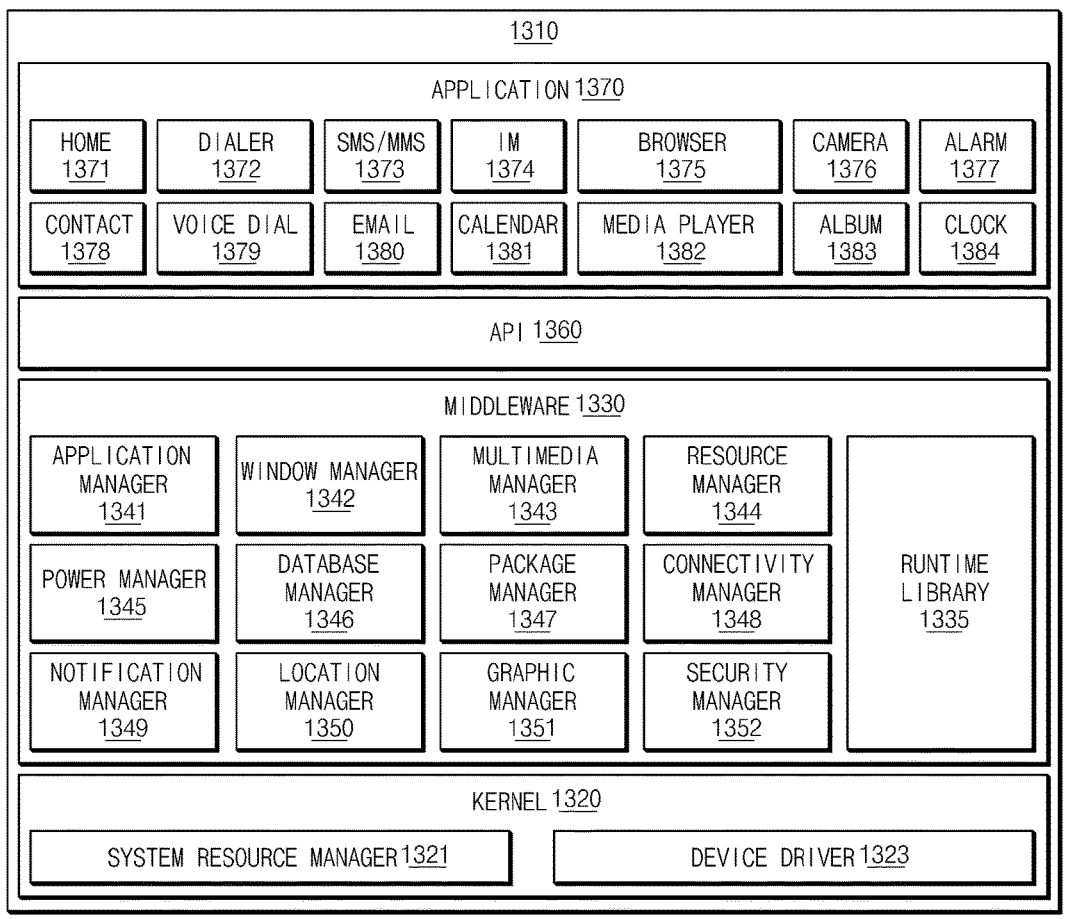
FIG. 13 illustrates a block diagram of a program module according to various embodiments.

FIG. 13 is a block diagram illustrating a program module according to an example embodiment of the present disclosure.

Referring to FIG. 13, a program module 1310 (e.g., the program 1140) may include an operating system (OS) for controlling a resource related to an electronic device (e.g., the electronic device 1101) and/or various applications (e.g., the application program 1147) running on the OS. The operating system may be, for example, Android, iOS, Windows, Symbian, Tizen, or the like.

The program module 1310 may include a kernel 1320, a middleware 1330, an API 1360, and/or an application 1370. At least a part of the program module 1310 may be preloaded on an electronic device or may be downloaded from an external electronic device (e.g., the first electronic device 1102, the second external electronic device 1104, or the server 1106).

The kernel 1320 (e.g., the kernel 1141) may include, for example, a system resource manager 1321 or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include, for example, a library module that a complier uses to add a new function through a programming language while the application 1370 is running. The runtime library 1335 may perform a function for input/output management, memory management, or an arithmetic function.

The application manager 1341 may mange, for example, a life cycle of at least one of the applications 1370. The window manager 1342 may manage a GUI resource used in a screen. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage a battery or power and may provide power information required for operating the electronic device. The database manager 1346 may generate, search, or modify a database to be used in at least one of the applications 1370. The package manager 1347 may manage installation or update of an application distributed in a package file format.

The connectivity manger 1348 may manage wireless connection of Wi-Fi, Bluetooth, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a user interface related thereto. The security manager 1352 may provide various security functions required for system security or user authentication. According to an embodiment of the present disclosure, in the case in which an electronic device (e.g., the electronic device 1101) includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an operating system to provide differentiated functions. Furthermore, the middleware 1330 may delete a part of existing elements or may add new elements dynamically.

The API 1360 (e.g., the API 1145) which is, for example, a set of API programming functions may be provided in different configurations according to an operating system. For example, in the case of Android or iOS, one API set may be provided for each platform, and, in the case of Tizen, at least two API sets may be provided for each platform.

The application 1370 (e.g., the application program 1147), for example, may include at least one application capable of performing functions such as a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, health care (e.g., measure an exercise amount or blood sugar), or environmental information provision (e.g., provide air pressure, humidity, or temperature information).

According to an example embodiment of the present disclosure, the application 1370 may include an information exchange application for supporting information exchange between the electronic device (e.g., the electronic device 1101) and an external electronic device (e.g., the first electronic device 1102 or the second external electronic device 1104). The information exchange application may include, for example, a notification relay application for relaying specific information to the external electronic device or a device management application for managing the external electronic device.

For example, the notification relay application may have a function for relaying, to an external electronic device (e.g., the first electronic device 1102 or the second external electronic device 1104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1102 or the second external electronic device 1104) communicating with the electronic device, an application running in the external electronic device, or a service (e.g., a call service, a message service, or the like) provided from the external electronic device.

According to an example embodiment of the present disclosure, the application 1370 may include a specified application (e.g., a healthcare application of a mobile medical device) according to an attribute of the external electronic device (e.g., the first electronic device 1102 or the second external electronic device 1104). The application 1370 may include an application received from an external electronic device (e.g., the first electronic device 1102 or the second external electronic device 1104). The application 1370 may include a preloaded application or a third-party application downloadable from a server. The names of the elements of the program module 1310 illustrated may vary with the type of an operating system.

According to various example embodiments of the present disclosure, at least a part of the program module 1310 may be implemented with software, firmware, hardware, or a combination thereof. At least a part of the program module 1310, for example, may be implemented (e.g., executed) by a processor (e.g., the processor 1210). At least a part of the program module 1310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory;
a communication interface, including communication interface circuitry; and
a processor electrically connected to the memory and the communication interface,
wherein the processor is configured to:
   extract a first audio signal to be output through a speaker, based at least on audio data received from an external electronic device and/or stored in the memory;
   generate a second audio signal obtained by at least removing the first audio signal from the audio data, wherein the second audio signal includes at least a noise signal of the audio data; and
   generate a haptic signal for outputting a haptic effect, based at least on the second audio signal.

2. The electronic device of claim 1, wherein the electronic device is one of a camera device, a haptic device, or a server device or is a device for controlling at least one of the camera device and the haptic device.

3. The electronic device of claim 1, wherein the processor is configured to:
   segment the audio data at a preset time period to generate a plurality of audio frames; and
   perform Fourier transform on the plurality of audio frames.

4. The electronic device of claim 3, wherein at least one of the audio frames has a section in which the audio frame overlaps another audio frame of a time period before and/or after the audio frame.

5. The electronic device of claim 3, wherein the processor is configured to:
remove the noise signal from the plurality of audio frames via noise canceling to extract the first audio signal.

6. The electronic device of claim 3, wherein the second audio signal comprises a signal to noise ratio (SNR) for each frequency included in the plurality of audio frames.

7. The electronic device of claim 1, wherein the processor is configured to:
segment the second audio signal at a preset time period to generate a plurality of audio frames; and
perform sound pressure level (SPL) on the plurality of audio frames to determine intensity of the haptic effect.

8. The electronic device of claim 7, wherein the processor is configured to:
analyze a statistical feature of the plurality of audio frames; and
determine a type and/or an output method of the haptic effect.

9. The electronic device of claim 8, wherein the processor is configured to:
calculate Mel-frequency cepstral coefficients (MFCC) and/or a spectral slope of each of the plurality of audio frames.

10. The electronic device of claim 9, wherein the processor is configured to:
if variance of the MFCC is greater than a preset value, set a change value of vibration according to the haptic effect to a specified value or more.

11. The electronic device of claim 9, wherein the processor is configured to:
if variance of the MFCC is less than a preset value, set a change value of vibration according to the haptic effect to a specified value or less.

12. The electronic device of claim 1, wherein the audio data is collected through a microphone array, and
wherein the processor is configured to:
detect an interaural time difference (ITD) and/or an interaural level difference (ILD) of the second audio signal.

13. The electronic device of claim 12, wherein the processor is configured to:
determine a direction of the haptic effect based on the detected ITD and/or ILD.

14. The electronic device of claim 1, wherein the processor is configured to:
receive additional information associated with the audio data from an external device; and
correct the haptic signal based at least on the additional information.

15. A haptic signal producing method performed by an electronic device, the method comprising:
extracting a first audio signal to be output through a speaker, based at least on audio data received from an external electronic device and/or stored in the memory;
generating a second audio signal obtained by at least removing the first audio signal from the audio data, wherein the second audio signal includes a noise signal of the audio data; and
generating a haptic signal for outputting an haptic effect, based at least on the second audio signal.

16. The method of claim 15, wherein the extracting of the first audio signal includes:
removing the noise signal from a plurality of audio frames depending on a specified noise cancellation algorithm to extract the first audio signal.

17. The method of claim 15, wherein the generating of the haptic signal includes:
segmenting the second audio signal at a preset time period to generate a plurality of audio frames; and
performing SPL on the plurality of audio frames to determine intensity of the haptic effect.

18. The method of claim 15, wherein the generating of the haptic signal includes:
calculating MFCC and/or a spectral slope of each of a plurality of audio frames.

19. The method of claim 18, wherein the generating of the haptic signal includes:
calculating MFCC of each of a plurality of audio frames;
if variance of the MFCC is greater than a preset value, setting a change value of vibration according to the haptic effect to a specified value or more; and
if variance of the MFCC is less than the preset value, setting the change value of vibration according to the haptic effect to the specified value or less.

20. The method of claim 15, wherein the generating of the second audio signal includes:
receiving additional information associated with the audio data from an external device; and
correcting the haptic signal based at least on the additional information.

* * * * *